(12) United States Patent
Kuno et al.

(10) Patent No.: US 8,224,811 B2
(45) Date of Patent: Jul. 17, 2012

(54) WORKLOAD MANAGEMENT USING ROBUSTNESS MAPPING

(75) Inventors: Harumi Kuno, Cupertino, CA (US); Umeshwar Dayal, Saratoga, CA (US); Janet L. Wiener, Palo Alto, CA (US); Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 677 days.

(21) Appl. No.: 12/364,113

(22) Filed: Feb. 2, 2009

(65) Prior Publication Data

US 2010/0198807 A1 Aug. 5, 2010

(51) Int. Cl.
*G06F 17/30* (2006.01)
(52) U.S. Cl. ........................ 707/718; 707/719
(58) Field of Classification Search .................. 707/718, 707/999.02, 719
See application file for complete search history.

(56) References Cited

U.S. PATENT DOCUMENTS

| | | | |
|---|---|---|---|
| 6,366,901 B1 * | 4/2002 | Ellis | 1/1 |
| 2003/0177137 A1 | 9/2003 | MacLeod et al. | |
| 2005/0222965 A1 | 10/2005 | Chaudhuri et al. | |
| 2006/0190310 A1 | 8/2006 | Gudla et al. | |
| 2006/0200451 A1 | 9/2006 | Kosuru et al. | |
| 2007/0143246 A1 | 6/2007 | Bestgen et al. | |
| 2008/0195577 A1 * | 8/2008 | Fan et al. | 707/2 |
| 2008/0270346 A1 * | 10/2008 | Mehta et al. | 707/2 |
| 2010/0145929 A1 * | 6/2010 | Burger et al. | 707/713 |

\* cited by examiner

*Primary Examiner* — Cam Truong

(57) ABSTRACT

Computer-implemented systems and associated operating methods use performance maps created by evaluating robustness of a database operator, query plan, or query to analyze health of a currently-executing query. The computer-implemented system comprises logic that receives one or more robustness maps of measured database system performance acquired during database execution in a predetermined range of runtime conditions. The logic analyzes state of a currently-executing query by locating the query's performance on the robustness maps.

10 Claims, 18 Drawing Sheets

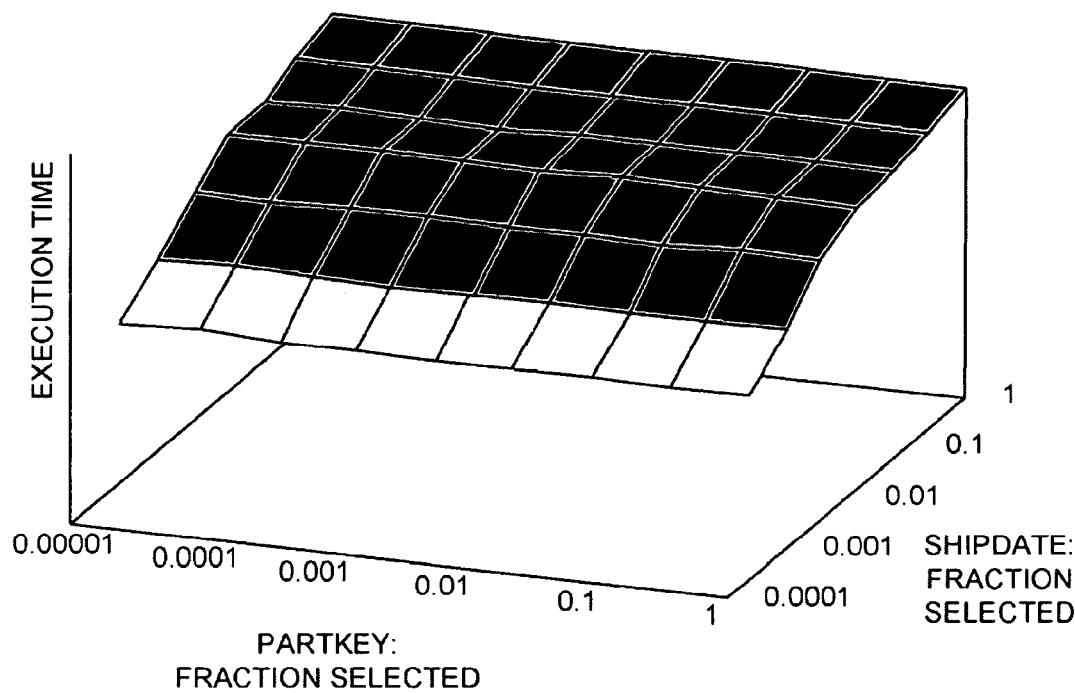
FIG. 7K(1)
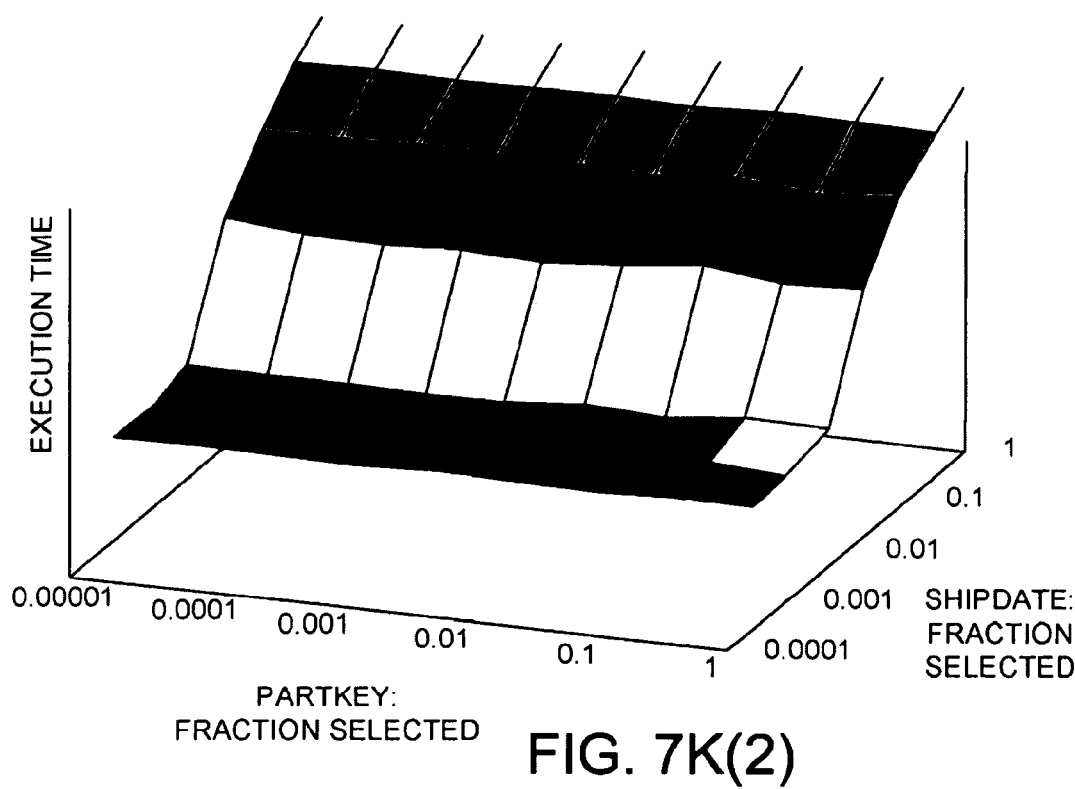
FIG. 7K(2)

WORKLOAD MANAGEMENT USING ROBUSTNESS MAPPING

BACKGROUND

Database workload management, both human and automatic, addresses the problems of deciding how to manage the admission, scheduling, and execution of queries in a database system. For a data warehouse, the problems are especially challenging because jobs have uncertain resource requirements. For example, uncertainty creates particular difficulty in accurately detecting and handling "problem queries"—improperly functioning queries that may not complete and that may consume resources that could otherwise be used by properly functioning queries. Some commercial database systems supply tools for measuring resource consumption of a running query, but do not consider predicted resource usage or attempt to quantify progress or work remaining of a query. Database physical design advisors evaluate physical design search spaces, often with regard to specific query plans or atomic query plans, but do not consider a variety of runtime conditions such as resource availability and have comparisons are based completely on query optimizer cost estimates and not actual performance measurements. Traditional techniques for data workload management include usage of query progress indicators, query plan analysis, and workload execution management.

Query progress indicators are tools that attempt to quantify as a fraction the work that a running query has completed over the amount of work the query is likely to complete in total. Progress indicators generally use the size of intermediate results as a direct reflection of progress for collected statistics including output cardinality, average tuple size. Other techniques distinguish between classes of physical operators based on effectiveness of estimation methods, for example improving accuracy of estimation by excluding physical operators that perform nested iteration. Disadvantages of query progress indicators include: (1) reliance on accurate counts of the tuples processed by various operators, thus requiring developers to instrument the database core engine to count the tuples input and emitted from every operator; (2) because different types of operators process tuples at different rates, tuple-count based progress indicators require a model for dividing time to process a query among various types of operators wherein the model includes per-operator models of tuple processing rates as well as a model of mutual interaction of the per-operator models within processing of a single query; (3) query progress indicators fail to indicate whether query execution is progressing as expected; and (4) query progress indicators fail to evaluate impact of runtime conditions.

Workload execution management is implemented in many commercial database systems and includes various techniques and systems for dealing with problem queries. For example, HP-UX Workload Manager, IBM Query Patroller for DB2, SQLServer Query Governor, Teradata's Dynamic Workload Manager, and Oracle's Database Resource Manager all include functionality to control or address queries that exceed a limit on estimated row counts, processing time, or place a limit on the number of join operations that can appear in a plan. IBM's Query Patroller for DB2 and Oracle's Database Resource Manager enable a system administrator to define usergroups to which a static priority and a share of system resources for each group are assigned. The higher the priority of a group, the more resources are allocated. However, the static prioritization is not associated with response time requirements or service level agreement (SLA) conformance. Similarly, SQLServer Query Governor prevents queries with estimated query costs that exceed a user-set upper cost limit from starting, as opposed to stopping the queries after reaching a predefined limit. These commercial attempts at managing long-running queries have required one or more of the following: (1) absolute limits on resource usage (for example, not admitting a query or stopping a query that exceeds a limit on estimated row counts, processing time, or placing a limit on the number of join operations that can appear in a plan), and (2) capability to obtain statistics such as actual input and output cardinalities. Obtaining such statistics can be prohibitively expensive, placing a great load on a running system.

Traditional query plan analysis techniques do not consider the impact of variable runtime conditions, such as resource availability, and do not systematically gather actual performance measurements over a variety of runtime conditions. Furthermore, traditional solutions focus on the selection of optimal query plans for a small range expected conditions, as opposed to the evaluation of database operators under a wide variety of actual conditions. For example, Harista et al. (U.S. Publication No. 2002/0046030) discloses a system that maps how well queries perform relative to one another in terms of estimated (expected) performance in ranges of the selectivity of a simple single-operator query with up to two parameters. Because the goal in Harista et al. is to reduce the number of plans in the query optimizer's plan search space, actual performance is not modeled and the impact of other conditions such as resource availability is not considered. Database regression tests may test the performance of individual operators, sometimes under specific resource availability conditions, but do not evaluate performance across a spectrum of conditions and do not consider performance as a continuous function across a spectrum of conditions. Database regression tests are used to evaluate performance—results are not stored nor later used to calculate an estimate for a specific query's performance under specific conditions.

SUMMARY

Embodiments of computer-implemented systems and associated operating methods use performance maps created by evaluating robustness of a database operator, query plan, or query to analyze health of a currently-executing query. The computer-implemented system comprises logic that receives one or more robustness maps of measured database system performance acquired during database execution in a predetermined range of runtime conditions. The logic analyzes state of a currently-executing query by locating the query's performance on the robustness maps.

BRIEF DESCRIPTION OF THE DRAWINGS

Embodiments of the invention relating to both structure and method of operation may best be understood by referring to the following description and accompanying drawings:

FIGS. 7A through 7M are pictorial diagrams showing maps of performance under specific runtime conditions.

DETAILED DESCRIPTION

Performance or robustness maps can be used to analyze health of a currently-executing query.

Performance or robustness maps can be used to evaluate workload management actions.

Systems and operating methods disclosed herein can use performance or robustness maps to perform workload management activities such as admission control, generation of new plans for queries, scheduling, execution control, and the like.

Robustness of the query plan can be evaluated by measuring performance with regard to a range of runtime conditions including resource availability and data characteristics. Evaluation of query plan robustness enables production of a set of measurements that can be displayed as a set of one or more maps. The measurements can be analyzed to identify landmarks, which are defined as features on the maps indicating regions where performance of a given database query plan degrades less than gracefully.

The systems and techniques disclosed herein explicitly evaluate performance in the context of evaluating the impact of changing conditions such as resource availability and the like on performance, and evaluating workload management actions enable rationalization of the complex factors and interactions that determine the performance of a database system. The systems and techniques can distinguish between "healthy" (favorable conditions and graceful degradation) and "unhealthy" (adverse conditions and severe degradation) states of query performance. The systems and techniques enable identification of when query performance is in an "unhealthy" state and prediction of when query performance is headed towards an "unhealthy" state and acting to remedy the situation before performance degrades. The systems and techniques can evaluate when a new query plan may improve the situation and can take workload management actions proactively.

Figure 1:
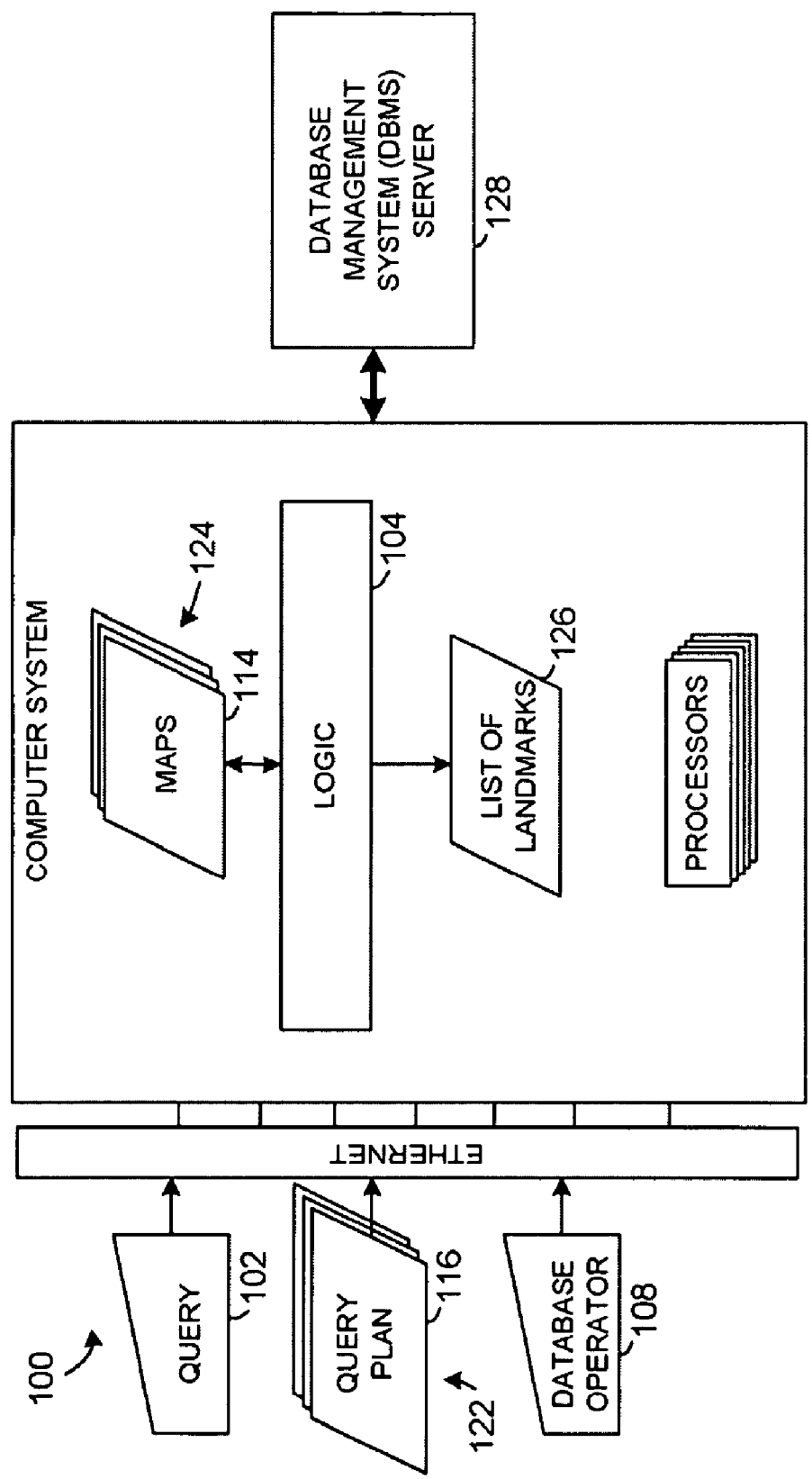
FIG. 1 is a schematic block diagram showing an embodiment of a computer-implemented system that uses performance maps created by evaluating robustness of a database operator, query plan, or query to analyze health of a currently-executing query.

Referring to FIG. 1, a schematic block diagram illustrates an embodiment of a computer-implemented system 100 that uses performance maps 114 created by evaluating robustness of a database operator 108, query plan 116, or query 102 to analyze health of a currently-executing query 102. The computer-implemented system 100 comprises logic 104 that receives one or more robustness maps 114 of measured database system performance acquired during database execution in a predetermined range of runtime conditions. The logic 104 analyzes state of a currently-executing query 102 by locating the query's performance on the robustness maps 114.

The system 100 can further comprise a target database system 128. The logic 104 can receive a set 122 of query plans 116 to be monitored and a set 124 of robustness maps 114 associated with the target database system 128. The logic 104 extracts a list 126 of potential landmarks indicative of conditions which cause performance to degrade in a manner different from a predetermined proper manner associated with individual query plans 116 of the set 122 of query plans 116. The logic 104 monitors execution of executing queries 116.

The logic 104 can monitor one or more aspects of performance of the executing queries 102 including, for example, characterizing range and trends of current operating conditions, identifying robustness landmarks, determining actions, and the like. The logic 104 can identify robustness landmarks pertinent to the executing queries 102 within a current range of operating conditions wherein performance is known to degrade in a manner different from a predetermined proper manner a predetermined amount. The logic 104 can identify robustness landmarks pertinent to the executing queries 102 which are likely to be encountered with persisting current trends. The logic 104 can determine for executing queries 102 whether corrective action is merited. The logic 104 can invoke a corrective action or raising a warning.

In some embodiments or implementations, the computer-implemented system 100 can comprise a set 122 of query plans 116 to be managed, and a set 124 of robustness maps 114 that include landmarks in terms of operator's cardinality, resource conditions, and performance for a target database management system. The logic 104 identifies landmarks pertinent to the query plans 116 and extracts and writes a set 126 of landmarks indicating conditions which cause performance to degrade in a manner different from a predetermined proper manner and probabilities of the conditions.

The computer-implemented system 100 can also be configured comprising a target database system 128. The logic 102 can receive a set 124 of robustness maps 114 and a set 110 of runtime statistics associated with the target database system 128. The logic 104 analyzes the robustness maps 114 and runtime statistics to characterize range and trends of current operating conditions, identify robustness landmarks present in the current range of operating conditions, and identify robustness landmarks to be subsequently encountered with a predetermined probability if operating condition trends persist.

Figure 2:
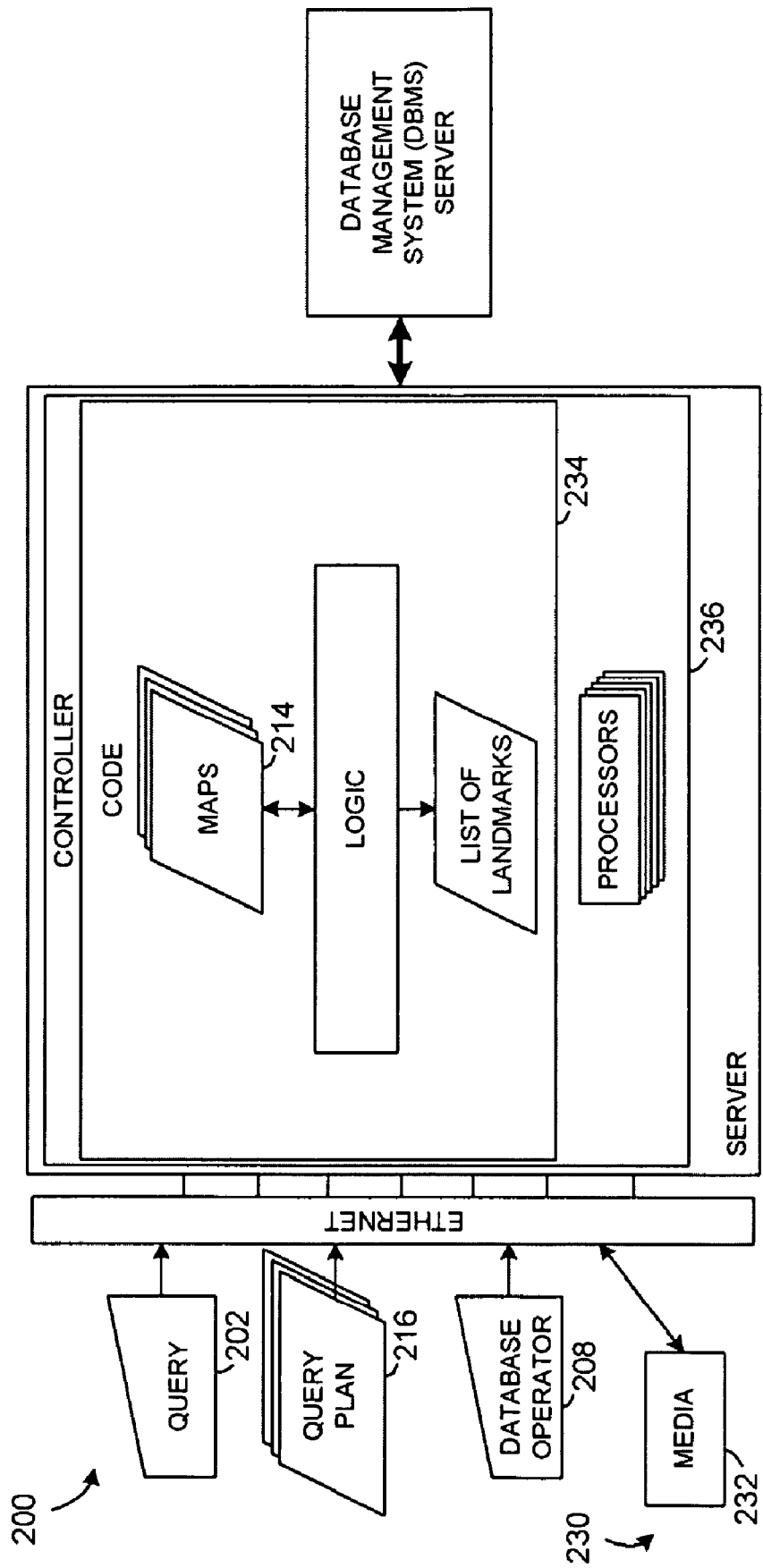
FIG. 2 is a schematic block diagram depicting an embodiment of a computer-implemented system in the form of an article of manufacture that that uses performance maps to analyze health of a currently-executing query.

Referring to FIG. 2, a schematic block diagram illustrates an embodiment of a computer-implemented system 200 in the form of an article of manufacture 230 that uses performance maps created by evaluating robustness of a database operator 208, query plan 216, or query 202 to analyze health of a currently-executing query 202. The article of manufacture 230 comprises a controller-usable medium 232 having a computer readable program code 234 embodied in a controller 236 for analyzing database system state. The computer readable program code 234 further comprises code causing the controller 236 to receive one or more robustness maps 214 of measured database system performance acquired during database execution in a predetermined range of runtime conditions. The computer readable program code 234 further comprises code causing the controller 236 to analyze state of a currently-executing query 202 by locating the query's performance on the one or more robustness maps 214.

Figure 3:
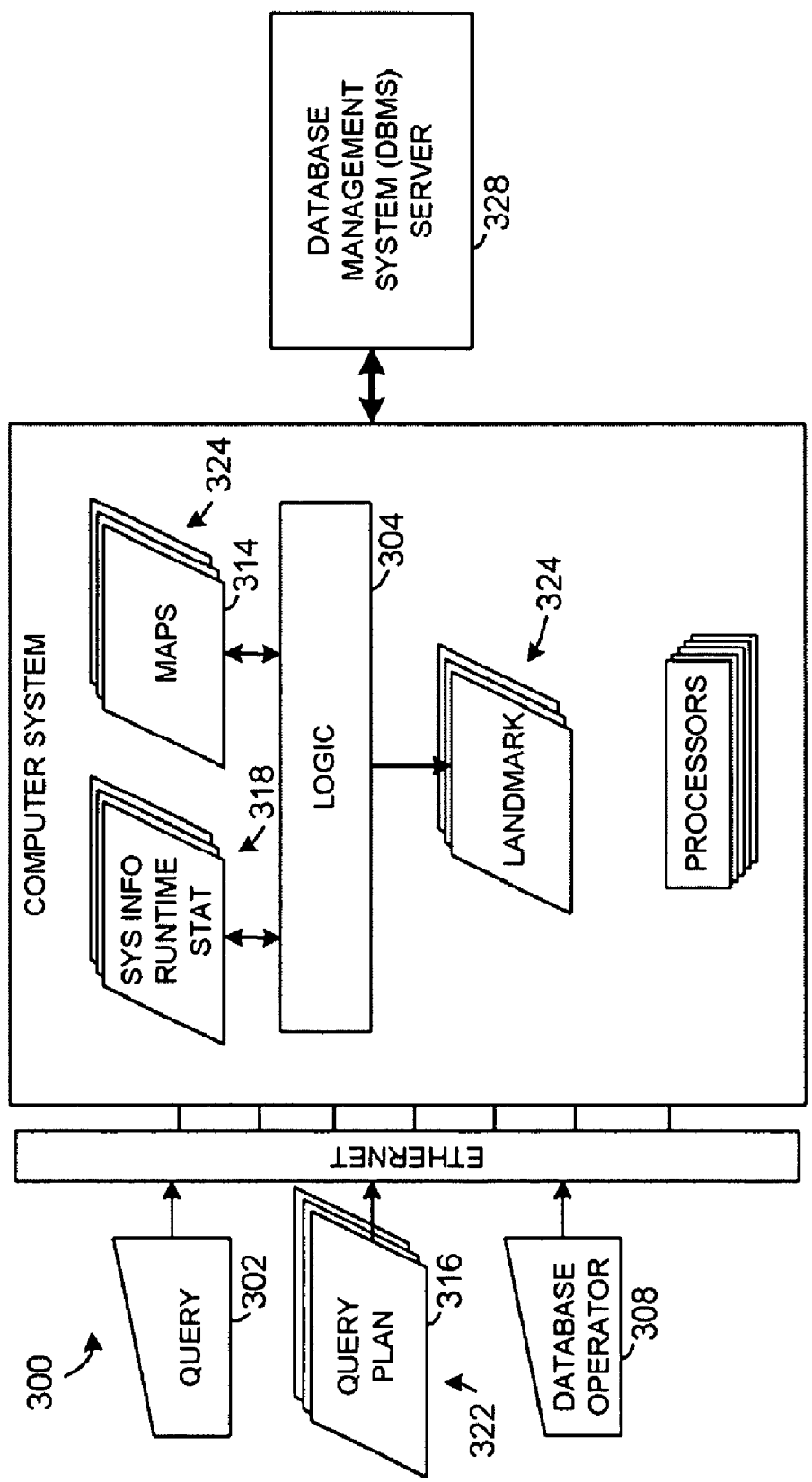
FIG. 3 is a schematic block diagram illustrating an embodiment of a computer-implemented system that uses performance maps created by evaluating robustness of a database operator, query plan, or query to perform workload management activities.

Referring to FIG. 3, a schematic block diagram illustrates an embodiment of a computer-implemented system 300 that uses performance maps 314 created by evaluating robustness of a database operator 308, query plan 316, or query 302 to perform workload management activities. The computer-implemented system 300 comprises logic 304 that receives one or more robustness maps 314 of measured database system performance acquired during database execution in a predetermined range of runtime conditions. The logic 304 performs workload management of one or more queries 302 by locating performance of the query or queries 302 on the one or more robustness maps 314.

The logic 304 can perform workload management comprising, for example, admitting queries 302, generating query plans 316, scheduling queries 302, and controlling query execution, and the like.

The logic 304 can perform a variety of workload management activities. For example, the logic 304 can selectively admit, reject, or re-optimize a selected query 302 based on whether the robustness map 314 indicates execution of the selected query under current runtime conditions has a predetermined probability of sudden performance degradation.

In another workload management aspect, the logic 304 can schedule a selected query 302 to execute when the robustness map 314 indicates resource availability conditions have a predetermined probability of attaining a predetermined level of favorability.

The logic 304 can also cancel and optionally re-optimize and re-submit an executing query 302 when the robustness map 314 indicates resource availability conditions are moving toward an area on the robustness map 314 that is identified to contain a defined robustness problem.

The logic 304 can reduce system load when the robustness map 314 indicates resource availability conditions are insufficient for current workload.

The logic 304 can schedule queries 302 using robustness maps 314 to identify resource requirements and prevent resource conflicts with concurrently executing queries.

In a further workload management aspect, the logic 304 can generate an alarm when the robustness map 314 indicates entry of an executing query into proximity of a defined robustness landmark.

The logic 304 can produce an analysis of progress of an executing query 302 by locating performance of the executing query on robustness maps 314 including monitoring current trends in runtime conditions and proximity of the executing query to robustness landmarks.

The system 300 can perform other actions and aspects of workload management.

In an example workload management embodiment, the computer-implemented system 300 can comprise a set 322 of query plans 316 to be managed, and a set 324 of robustness maps 314 including landmarks in terms of operator's cardinality, resource conditions, and performance for a target database management system 328. The logic 304 identifies landmarks pertinent to the query plans 316 and extracts and writes a set 326 of landmarks indicating conditions causing performance to degrade in a manner different from a predetermined proper manner and probabilities of the conditions.

The computer-implemented system 300 can further comprise a set 318 of system information and runtime statistics. The logic 304 can track execution conditions for an executing query 302 in terms of actual resource availability and cardinality conditions, and analyzes query execution relative to the set 326 of landmarks and the set 318 of system information and runtime statistics. The logic 304 determines whether execution conditions approach landmarks associated with a monitored query plan and evaluate management action with regard to the executing query.

The logic 304 can further determine whether management action is warranted for the execution conditions and, if so, determines and invokes the management action. The logic 304 determines whether the management action warrants creation of a new query plan and, if so, updates landmarks relevant to monitored query plans and writes the updated landmarks to the set of landmarks.

Figure 4:
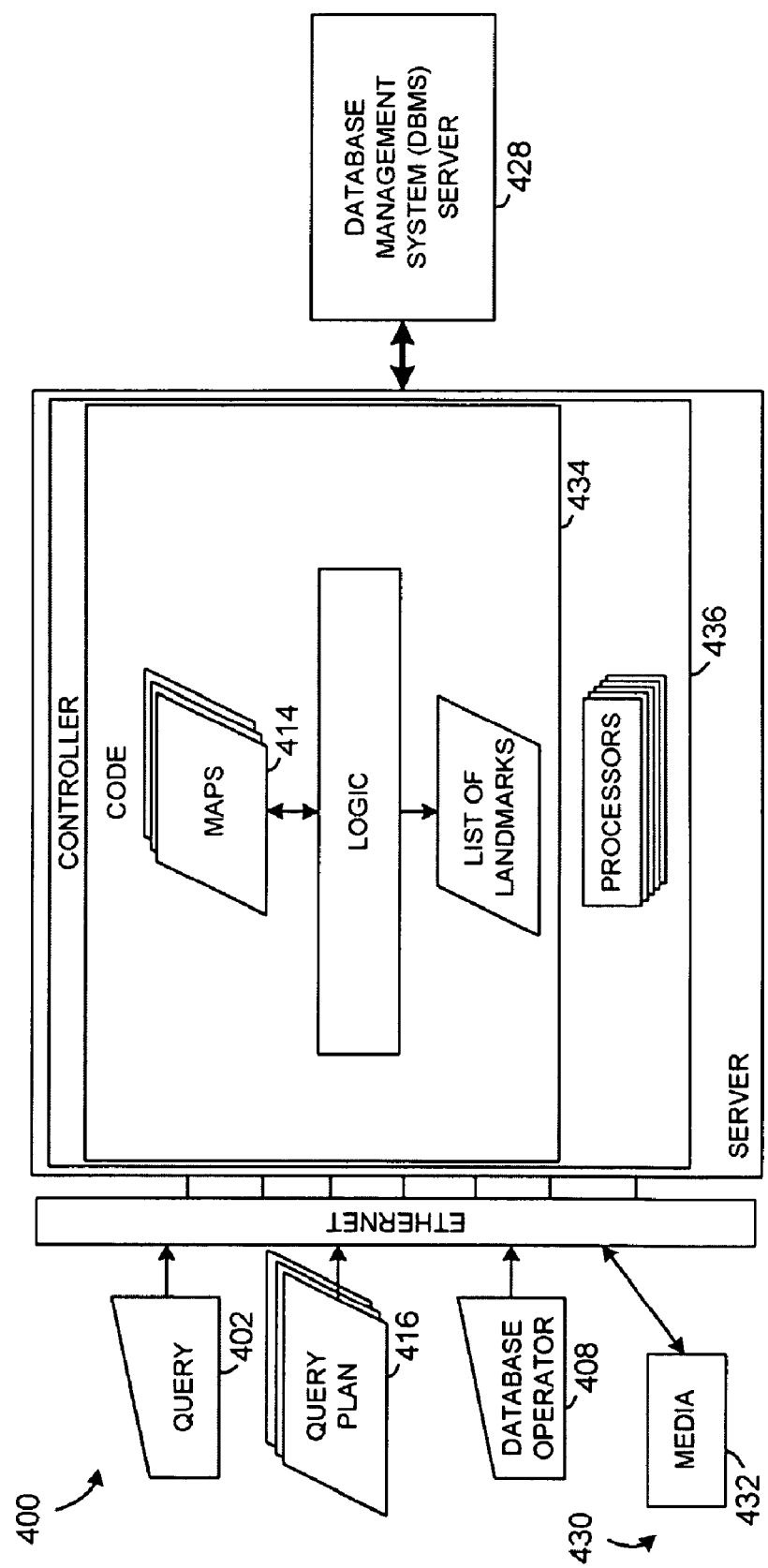
FIG. 4 is a schematic block diagram depicting an embodiment of a computer-implemented system in the form of an article of manufacture that uses performance maps created by evaluating robustness of a database operator, query plan, or query to perform workload management activities.

Referring to FIG. 4, a schematic block diagram illustrates an embodiment of a computer-implemented system 400 in the form of an article of manufacture 430 that uses performance maps 414 created by evaluating robustness of a database operator 408, query plan 416, or query 402 to perform workload management activities. The article of manufacture 430 comprises a controller-usable medium 432 having a computer readable program code 434 embodied in a controller 436 for managing workloads in a database system 428. The computer readable program code 434 comprises code causing the controller 436 to receive a robustness map 414 of measured database system performance acquired during database execution in a predetermined range of runtime conditions. The computer readable program code 434 further comprises code causing the controller 436 to perform workload management of at least one query 402 by locating performance of the at least one query on the robustness map 414.

Figure 5:
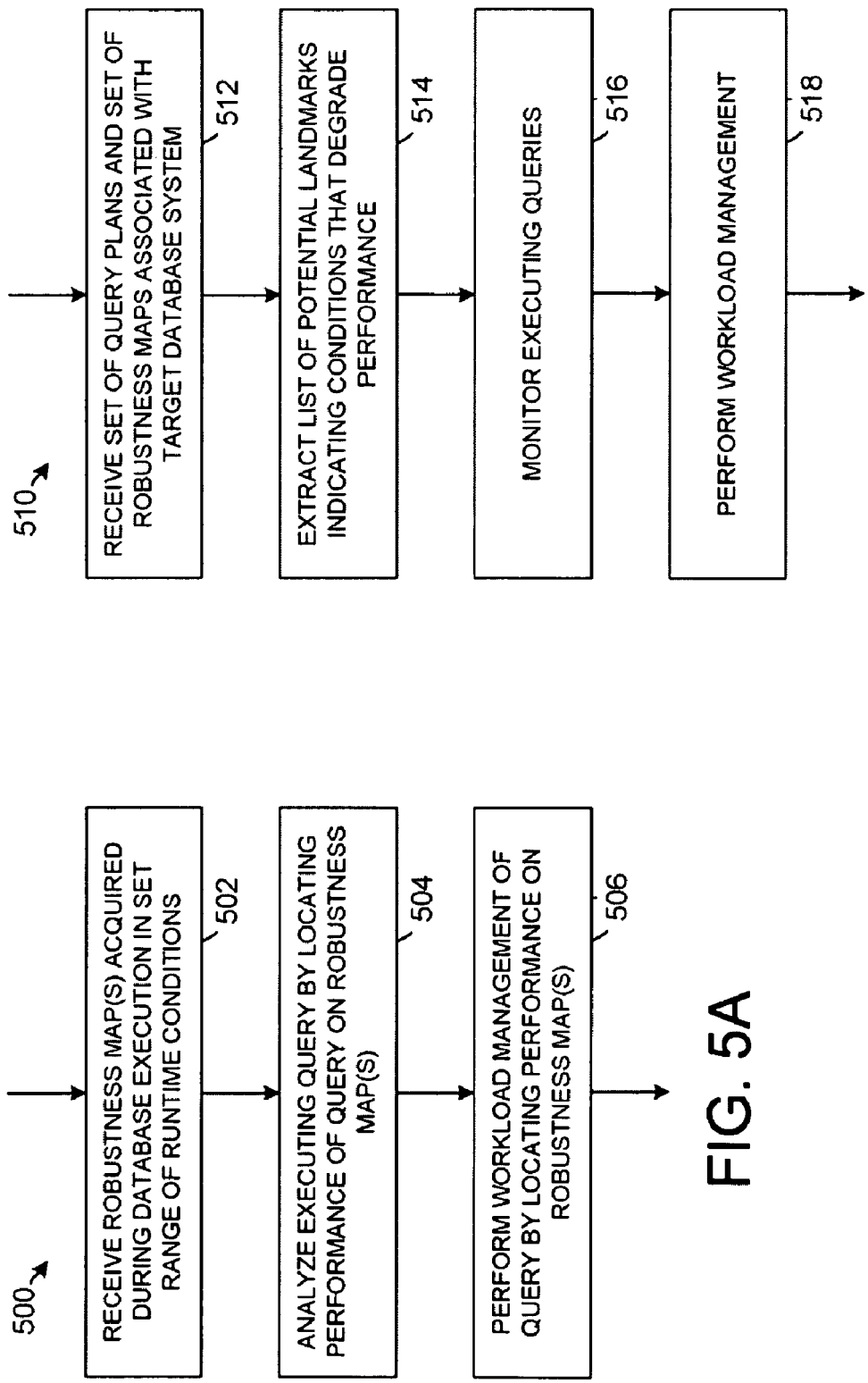
FIGS. 5A and 5B are flow charts illustrating one or more embodiments or aspects of a computer-executed method for evaluating robustness of a database operator, query plan, or query, and performing workload management activities.

Referring to FIGS. 5A and 5B, flow charts illustrate one or more embodiments or aspects of a computer-executed method for operating a database system. The method uses performance maps created by evaluating robustness of a database operator, query plan, or query to perform workload management activities. FIG. 5A depicts a computer-executed method 500 for operating a database system comprising receiving 502 one or more robustness maps of measured database system performance acquired during database execution in a predetermined range of runtime conditions. State of a currently-executing query is analyzed 504 by locating performance of the query on the one or more robustness maps. The method 500 further comprises performing 506 workload management of at least one query by locating the performance of the at least one query on the at least one robustness map.

Referring to FIG. 5B, a method 510 for managing workload based on analysis of robustness maps is shown. The method 510 comprises receiving 512 a set of query plans to be monitored and a set of robustness maps associated with a target database system, and extracting 514 a list of potential landmarks indicative of conditions causing performance to degrade in a manner different from a predetermined proper manner associated with individual query plans of the set of query plans. Execution of queries is monitored 516 and workload management is performed 518 which includes, for example, admitting queries, generating query plans, scheduling queries, and controlling query execution.

Figure 6:
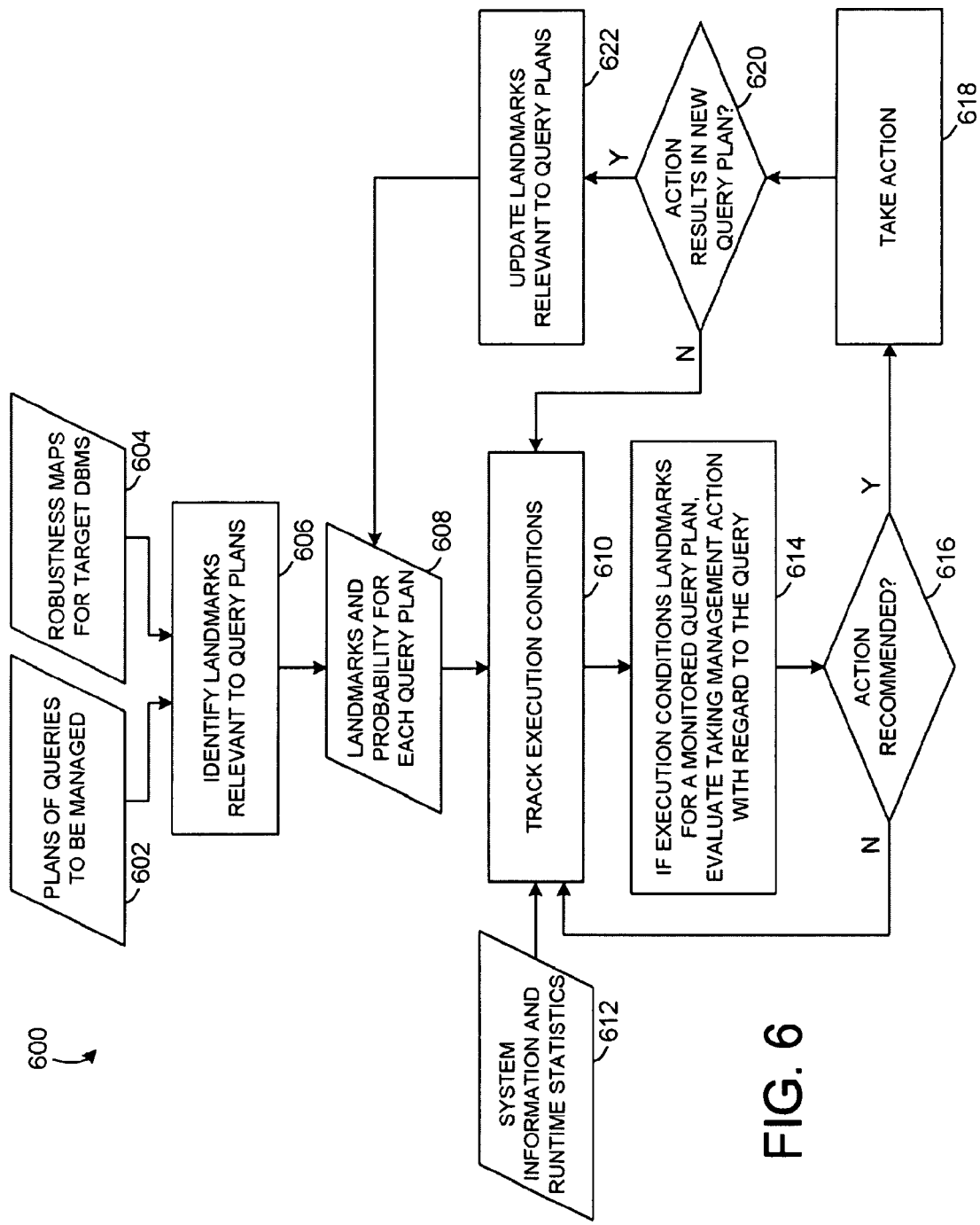
FIG. 6 is a schematic flow chart showing an embodiment of method for using robustness maps to evaluate how changing conditions (resource availability, cardinality, and others) can impact performance.

Referring to FIG. 6, a schematic flow chart illustrates an embodiment of method 600 for using robustness maps to evaluate how changing conditions (resource availability, cardinality, and others) can impact performance. For example, FIG. 6 defines an action flow showing monitoring of execution of multiple queries by a workload management system. Given a set 602 of plans of queries to be monitored, as well as robustness maps 604 associated with the target database system, a list of the potential landmarks (features on the maps indicating conditions that could cause performance to suddenly degrade) relevant to or associated with each query plan can be extracted and identified 606. The robustness maps 604 can include coordinates of "danger zone landmarks" in terms of an operator's cardinality, resource conditions, and/or performance for the target database management system. The landmarks and probability or risk of conditions being met for each query plan can be stored 608.

Execution of the running queries in then monitored 610, for example by periodically acquiring runtime statistics. The query execution conditions that can be tracked or monitored 610 can include actual resource availability, cardinality conditions, and the like wherein the actual location of a selected condition can be tracked on performance maps. The executing queries can be tracked 610 by monitoring the stored landmarks and risk conditions 608 and system information and runtime statistics 612. Monitoring 610 of the executing queries can include one or more of several actions including: (1) characterizing the range and trends of current operating conditions; (2) identifying relevant "robustness" landmarks that fall into the current range of operating conditions (conditions under which the performance is known to degrade less than gracefully); (3) identifying "robustness" landmarks that are likely to be encountered if current trends persist, for example if available memory has been steadily decreasing; (4) deciding whether corrective action is merited; (5) if corrective action is recommended, then take the action; (6) if the action results in a new query plan (for example, if the action were to cancel one of the queries and then submit the query with a different plan), then updating the list of landmarks to be monitored; and the like.

If execution conditions approach landmarks associated with any monitored query plan, whether a management action should be taken with regard to that query is evaluated 614. If action is recommended 616, then the action is taken 618.

Many different potential corrective actions can be taken 618. For example, the system can admit, reject, or re-optimize a query based on whether execution of the query under current conditions is likely to suffer from suddenly degradation of performance. The system can schedule a query to run when resource availability conditions are likely to be favorable. The system can cancel and possibly re-optimize and re-submit an executing query if resource availability conditions are headed towards an area on a map that has been identified as containing a robustness problem. The system can act to reduce system load if resource availability conditions are not conducive to the current workload. The system can perform scheduling actions by using robustness maps to identify resource requirements and thereby avoid co-running queries with conflicting resource needs. The system can raise an alarm if a query enters the proximity of a "robustness landmark". In addition, the workload management system can produce an analysis of the progress of an executing query by locating query performance on robustness maps, for example noting current trends in runtime conditions and the executing query's proximity to any robustness landmarks. Other corrective actions are also possible.

If the action results in a new query plan 620, landmarks relevant to the monitored query plans are updated 622, and stored 608. Tracking 610 of execution conditions continues.

Figure 7A:
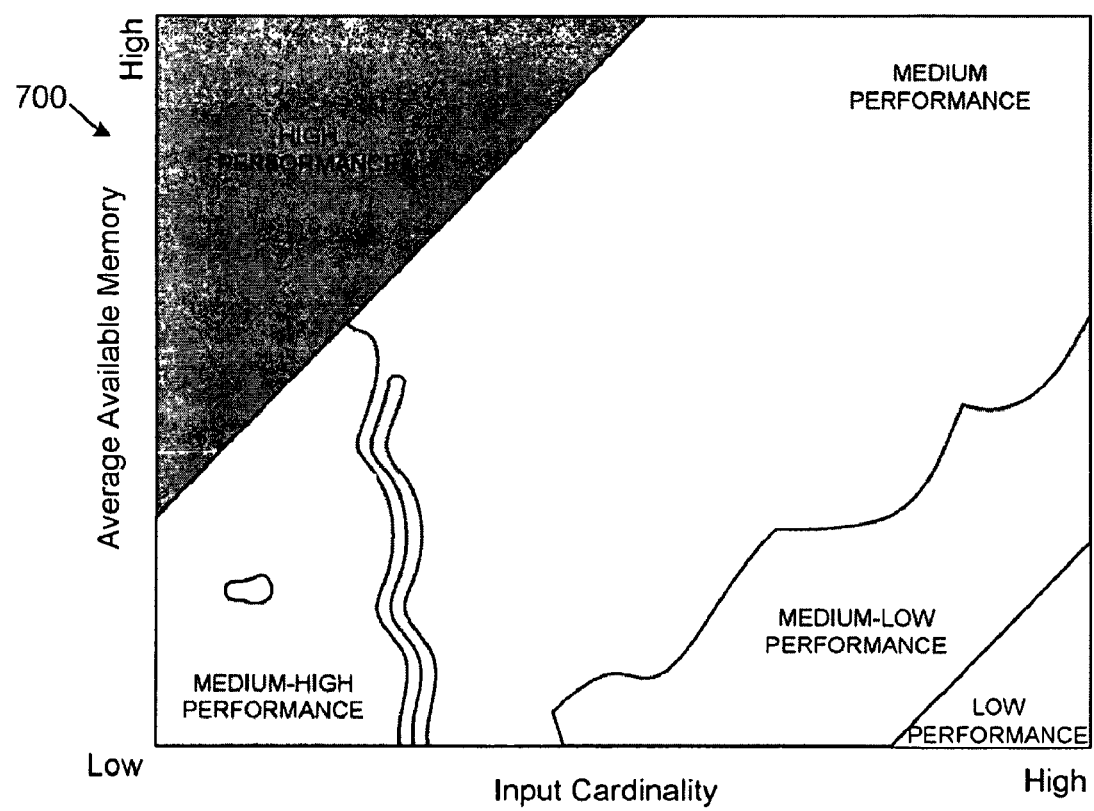

Referring to FIG. 7A, a pictorial diagram shows a hypothetical map comparing a target query plan to alternatives under specific runtime conditions. The X axis shows the number of rows of input that are processed during execution (cardinality). The Y axis represents the maximum amount of memory available to the executor for the subject query during execution. Regions of the map can be color-coded or gray-scale-coded according to results of comparison of the target query plan to alternatives under particular available memory/input tuples processed conditions. Darker colors indicate that the query plan compares less favorably to alternatives. A similar graph can be created for conditions such as average CPU load average during the execution of the query or other parameters. Multiple graphs can be combined to compare performance under multiple conditions, for example including aspects of one or more of cardinality, memory availability, CPU load average, average disk busy, and the like. Any number of other visualization techniques can be applied to capture the information. For example, the map can be annotated to mark a region of anticipated conditions under which the query is expected to execute.

Figure 7B:
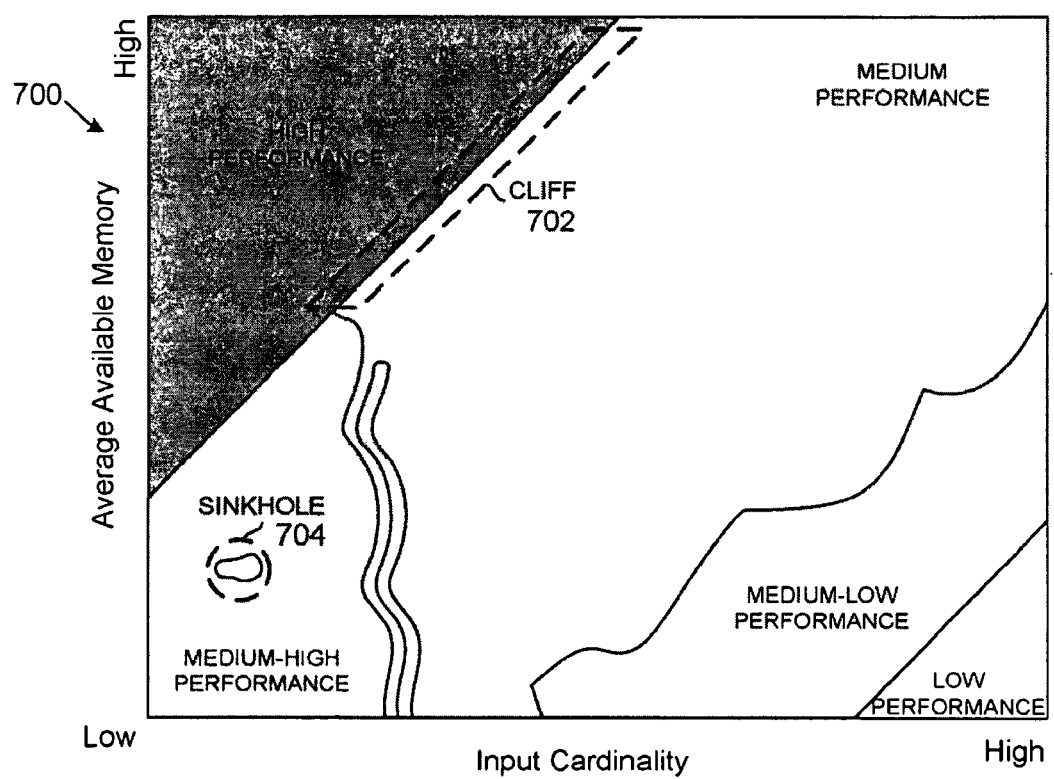

"Robustness" is defined herein as a measure of continuity of the curvature of the function describing performance under varying conditions. FIG. 7B shows how "interesting features" can be marked on the map 700. In an example application, areas of interest such as edges and holes where the target query plan's performance drops off precipitously when compared to the best alternative. Thus, where performance does not degrade gracefully. For example, the circled area labeled "cliff" 702 mark a long edge. The map 700 can accommodate any number of other types of features.

A query statement can be executed in many different ways, for example full table scans, index scans, nested loops, hash joins, and others. A query optimizer is a component of a database management system that attempts to determine the most efficient way to execute a query. The query optimizer determines the most efficient way to execute a SQL statement after considering many factors related to the objects referenced and the conditions specified in the query. The determination is a useful step in the processing of any query statement and can greatly affect execution time.

The query optimizer compares the available query plans for a target input query and estimates which of plan will be the most efficient in practice. One type of query optimizer operates on a cost basis and assigns an estimated cost to each possible query plan, for example selecting the plan with the smallest cost. Costs can be used to estimate the runtime cost of evaluating the query in terms of factors such as the number of I/O operations required, processor load requirements, and other factors which can be set forth in a data structure called a data dictionary which stores statistics used by the query optimizer. The set of available query plans that are examined is formed by examining the possible access paths, such as index scan and sequential scan, and join algorithms including sort-merge join, hash join, nested loops, and others. A search space can become very large according to complexity of the query.

Considering that performance of a database system during processing of a query depends on the ability of a query optimizer to select an appropriate plan for executing the query under an expected set of conditions (for example, cardinality estimates, resource availability assumptions), and the ability of an executor to process the query using the selected plan under actual runtime conditions, a challenge arises that actual runtime conditions can differ significantly from what is expected, particularly in situations where multiple queries execute simultaneously. For example, data skew can cause cardinality to exceed expectations by multiple orders of magnitude, or an unexpectedly heavyweight query can monopolize memory, leaving only a fraction of expected memory available. In a worst case, actual runtime conditions can be so adverse that the selected query plan can potentially be the worst, as opposed to the best, plan for the given conditions.

In addition, database operator implementations are typically tested to verify performance at specific points, as opposed to tested in terms of the continuity of performance degradation over a large range of conditions. Thus, performance can suddenly degrade dramatically and unexpectedly with only a minor change in conditions. Accordingly, the system 100 depicted in FIG. 1 and associated functionality, by creating a map of performance under a large range of conditions, enables the prediction and analysis of such performance degradation.

Figure 7C:
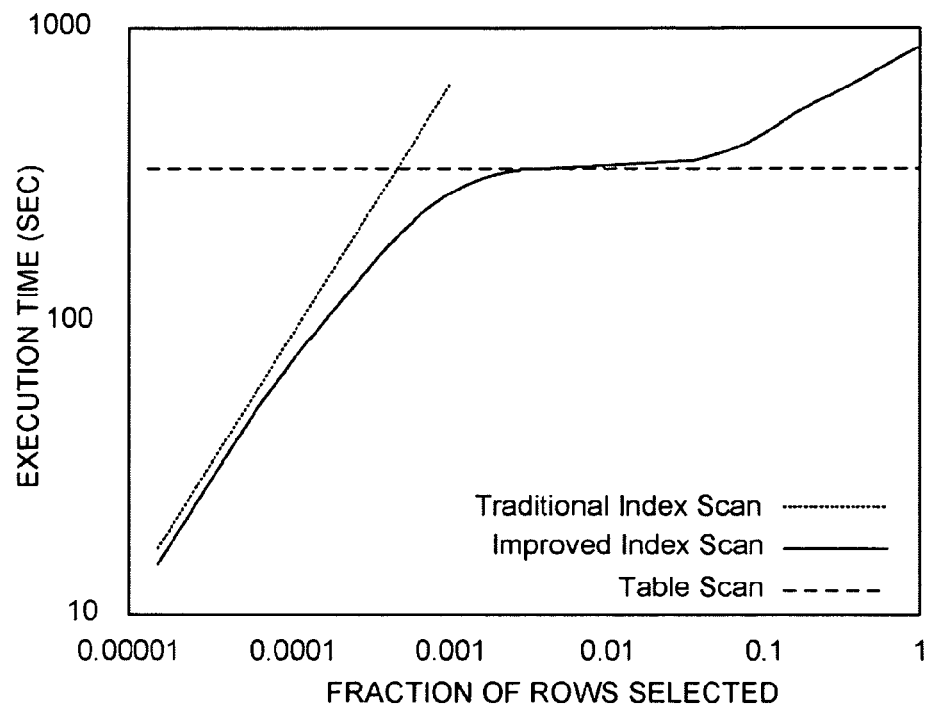

Referring to FIG. 7C, a diagram illustrates an example of a two-dimensional parameter space robustness table with single-table, single-predicate selection and shows execution times for selecting rows from a table (Transaction Processing Performance Council (TPC-H) benchmark line items, about 60M rows) for a variety of selectivities (result sizes). Selectivities and execution times both are shown with logarithmic scales. Query result sizes differ by a factor of two between data points. FIG. 7C shows performance of three query execution plans. One plan is a traditional table scan with performance constant across the entire range of selectivities. For small result sizes, the table scan is unacceptably slow compared to the index scans. A second plan is a traditional index scan, which is unacceptably slow for moderate and large result sizes due to the need to fetch qualifying rows from the table. Cost of the index scan is so high that showing the entire range of selectivities is not possible. The break-even point between table scan and traditional index scan is at about 30K result rows or $2^{-11}$ of the rows in the table. A third plan is an improved index scan which combines low latency for small results as well as high bandwidth for moderate result sizes. The cost of the improved index scan remains competitive with the table scan all the way up to about 4M result rows or $2^{-4}$ of the rows in the table. However, the improved index scan, despite improvement over the traditional index scan, has performance that is poor for large results. If all rows in the table satisfy the query predicate, the performance of the improved index scan is about 2½ times worse than a table scan. While a factor of 2½ is undesirable, cost is much less than cost of a traditional index scan which would exceed the cost of a table scan by multiple orders of magnitude.

An optimistic insight from FIG. 7C is that robust execution seems possible. A pessimistic insight is that the improved index scan as implemented in the system is not yet sufficiently robust. One perspective view is that a single query execution plan might eventually be superior or at least competitive across the entire range so that an erroneous choice during compile-time query optimization can be avoided by eliminating selection among alternatives. Another perspective view is that the query execution engine has not yet reached a sufficient level of sophistication and robustness. Considering the simple techniques that underlie the "improved" plan in FIG. 7C, appropriate run-time techniques can be used based on the usage of robustness maps analysis.

Although FIG. 7C can enable observations, insights, and perspective on a research effort, other visualizations enable additional insights into additional aspects of robustness and are helpful for individual operations such as index scans and for plan fragments such as scans of multiple indexes combined by index intersection. Visual images greatly assist in identifying poor scalability or robustness, discontinuities in actual execution costs, and the like. Thus, the further visualizations help in analyzing and reasoning about query execution algorithms, implementations, entire query execution plans or fragments thereof, and the query execution architecture.

The visualizations can be employed by database software vendors to target improvements in query execution, indexing techniques, and query optimization. The visualizations can be used by database administrators to analyze specific query execution plans to address unsatisfactory performance or robustness of query execution. Various visualizations have been found particularly helpful and are disclosed herein.

FIG. 7C is an example of a simple visualization of performance and robustness. One aspect of performance that can be verified by the two-dimensional diagram is that the actual execution cost is monotonic across the parameter space. For example, fetching of rows is expected to become more expensive with additional rows. If cases exist in which fetching more rows is cheaper than fetching fewer rows, some aspect of performance is anomalous. For example, the governing policy or some implementation mechanisms might be faulty in the algorithms that switch to pre-fetching large pages instead of fetching individual pages as needed. Moreover, the cost curve is expected to flatten, wherein the first derivative of the cost curve should monotonically decrease. Fetching more rows should cost more, but the difference between fetching 100 and 200 rows should not be greater than between fetching 1,000 and 1,100 rows, a condition that is not true for the improved index scan shown in FIG. 7C since the curve for the improved index scan shows a flat cost growth followed by a steeper cost growth for very large result sizes.

Figure 7D:
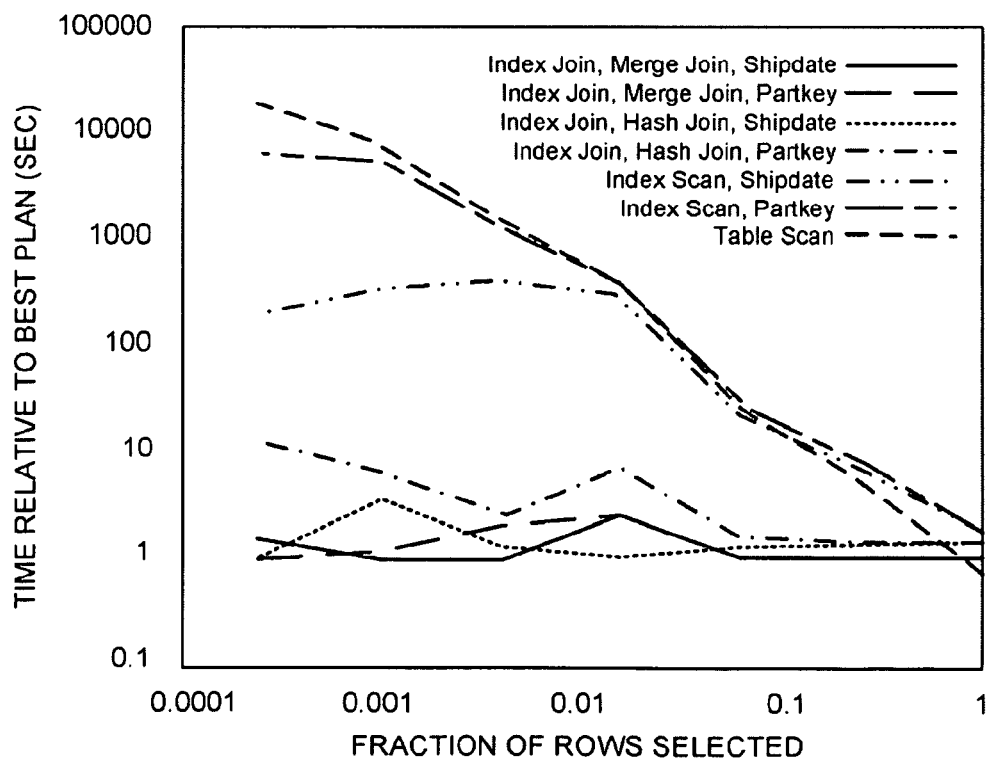

FIG. 7D is a diagram showing performance of plans for a simple query similar to the query of FIG. 7C, with two differences. First, performance is shown not in absolute times but relative to the best plan for each point in the parameter space. This type of diagram is most appropriate if the absolute performance varies very widely across the parameter space. In FIG. 7C for example, the left-most data point still represents an output size of about 900 rows ($60M \times 2^{-16}$). Even with a logarithmic scale for query execution costs, extending the diagram all the way to one output row would increase diagram height or reduce vertical resolution by a factor of 2½. Illustrating the relative performance of all plans may permit better resolution and better use of the space available for a diagram. Second, additional query execution plans are included, specifically multi-index plans that join non-clustered indexes such that the join result covers the query even if no single non-clustered index does. These index joins are performed by alternative join algorithms and using alternative join orders.

When comparing query execution plans for a given query, analysis includes determination of which classes of query execution plans to include such as: (1) only plans actually considered by the system under investigation; (2) plans that could be forced by some means or other including alternative syntax (for example, index intersection by means of multiple query aliases for the same database table); (3) plans that could be enabled only by an alternative database design (such as two-column indexes); or (4) plans that could be realized only with additional implementation effort by the software vendor (such as bitmap indexes, bitmap-driven sorting or intersection). Actual execution costs for the fourth class might be obtained through experiments using a competing database system that is more advanced in specific query execution techniques. The most appropriate class choice depends on whether design and future improvements of system components can be selected. For example, plans enabled by alternative syntax can considered if influence over the rewrite capabilities in the query optimization steps is available.

The diagrams can be implemented using either linear or logarithmic scales. Logarithmic scales on both axes permit reasonably detailed insight at both ends of the spectrum of possible parameter values. Curves can be formed to indicate absolute performance or performance relative to the best plan for any one point in the parameter space, where the definition for "best" might include any of the classes of query execution plans.

Robustness maps can also display performance in three-dimensional parameter spaces. Limitation to a single dimension within the parameter space both focuses and limits the insights. The interaction of dimensions can also be considered. The number of possible parameters may be very high, including multiple formal query parameters with run-time bindings; resource availability such as memory, processing bandwidth, I/O bandwidth, and interconnection bandwidth; and intermediate result sizes due to predicates (selection, joins), aggregation (projection, duplicate removal), and set operations (intersection, union, difference). Visualization practically forces consideration of two dimensions at a time and rotation through pairs of dimensions.

Figure 7E:
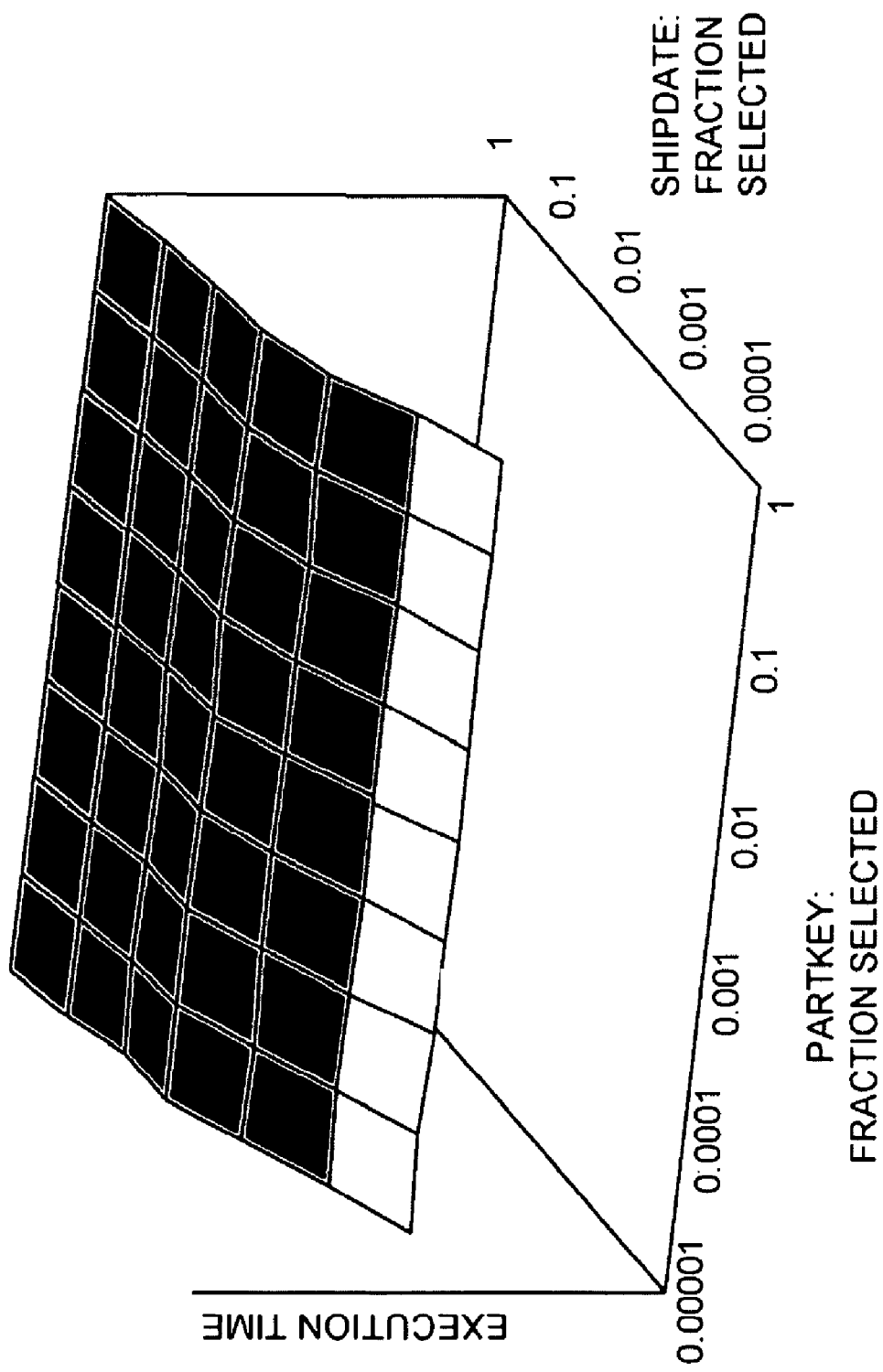

Referring to FIG. 7E, a three-dimensional map is shown which displays a parameter, illustratively execution time, in grayscale-coding or color-coding. The mapping shows elapsed times in colors or monochrome shades from green to red and finally black (light gray to black in monochrome) with each color or shade difference indicating an order of magnitude. FIG. 7E illustrates two-predicate, single-index selection, showing the execution cost for a query restricting two columns of a table. The query execution plan scans a single-column index and applies the second predicate only after fetching entire rows from the table's main storage structure. The two dimensions shown are the selectivities of the two predicate clauses. The third dimension is execution time, ranging from 4 seconds to 890 seconds.

As shown in FIG. 7E, the two dimensions have very different effects. In fact, one of the predicates appears to have practically no effect at all wherein the predicate can be evaluated only after fetching entire rows—a result which is predictable because index scans perform as expected and as coded in the cost calculations during query optimization. The actual behavior meets the anticipated behavior (reflected correctly in the cost function used during query optimization). FIG. 7E shows the robust query execution technology from FIG. 7C. While barely visible in FIG. 7E, FIG. 7C illustrates robustness very succinctly, demonstrating the value of visualizations using a combination of one-dimensional and two-dimensional parameter spaces.

Figure 7F:
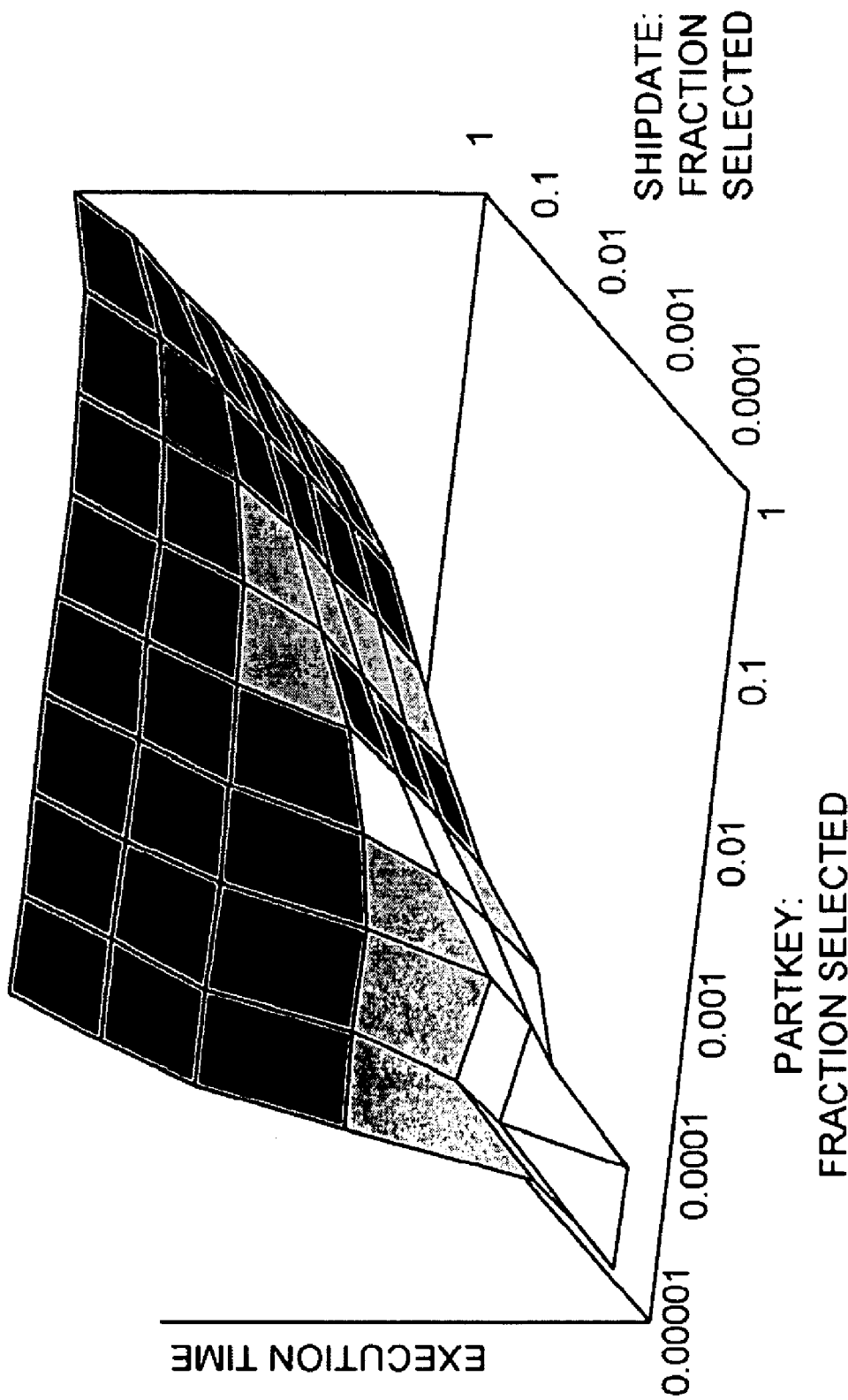

Referring to FIG. 7F, a three-dimensional diagram illustrates operation of a two-index merge join, and shows the execution cost for an alternative query execution plan, specifically scans of two single-column non-clustered indexes combined by a merge join. Other than some measurement flukes in the sub-second range (front left, green), the symmetry in the diagram indicates that the two dimensions have very similar effects. Hash join plans perform better in some cases but do not exhibit symmetry.

Figure 7G:
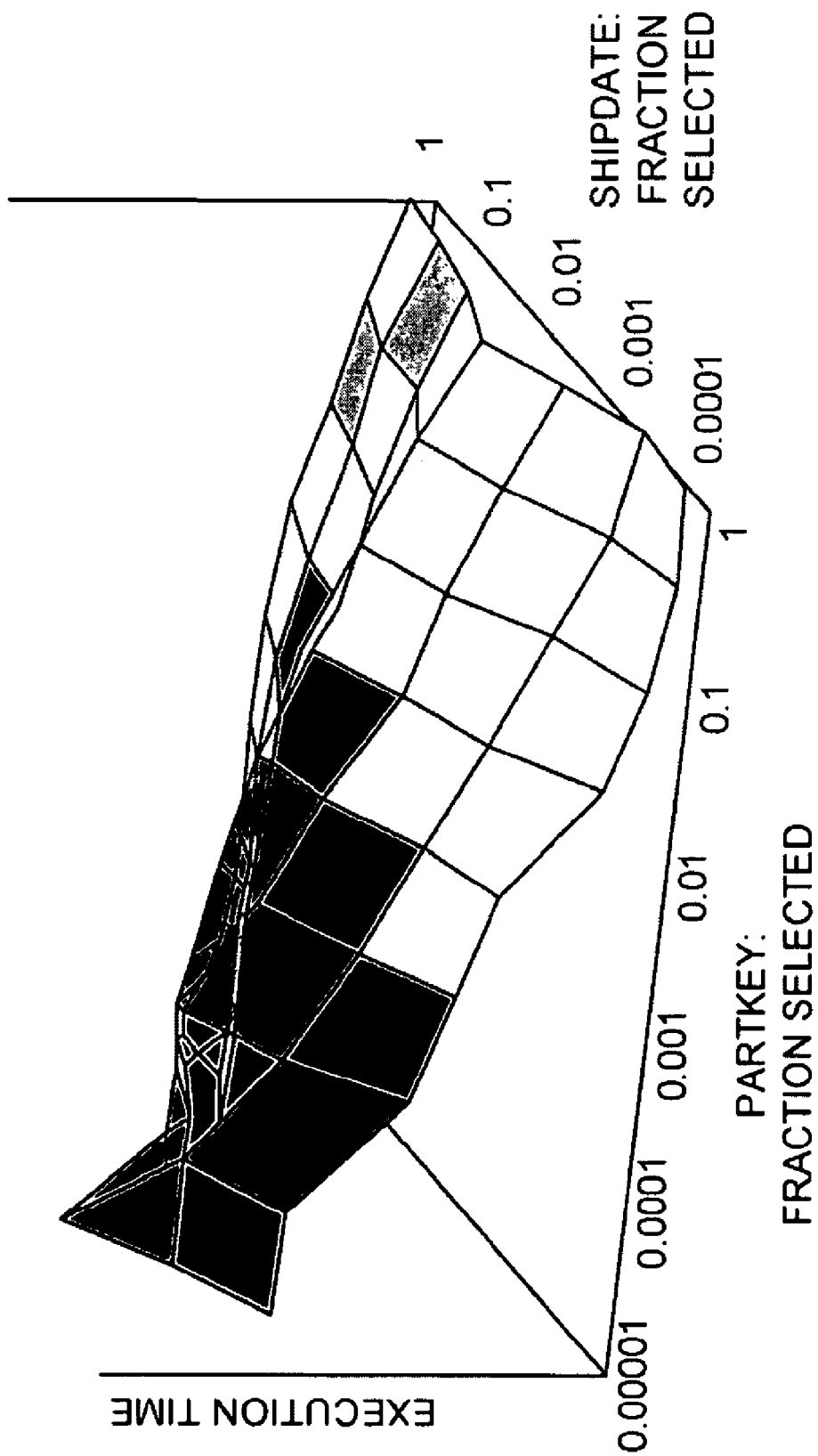

In addition to the two plans depicted in FIGS. 7E and 7F, FIG. 7G illustrates a map acquired by running five additional alternative query execution plans for the simple query. The query execution plans include a no-index table scan (actually, scanning a clustered index organized on an entirely unrelated column), a plan using a single-column non-clustered index for the other predicate clause, and three other plans combining two single-column non-clustered indexes (using merge join or hash join each in two join orders). The relative performance of each individual plan is plotted compared to the optimal plan at each point in the parameter space. A given plan is optimal if performance is equal to the optimal performance among all plans, so that the quotient of costs is 1. A plan is sub-optimal if the quotient is much higher than 1.

Referring to FIG. 7G, a three-dimensional diagram depicts performance of a single-index can relative to the best of seven plans. FIG. 7G shows the same data as FIG. 7E with performance indicated in terms of the relative difference to the best plan at each point. The diagram enables immediate recognition that the plan is optimal only in a small part of the parameter space. Moreover, the region is not continuous. While the absolute performance shown in FIG. 7E is fairly smooth, the relative performance shown in FIG. 7G is not smooth indicating that the costs of best plans are not smooth. In the example, the maximal difference is a factor of 101,000. Thus, while the plan is optimal in some regions of the parameter space, the worst relative performance is so poor that disruption of data center operation is likely.

Figure 7H:
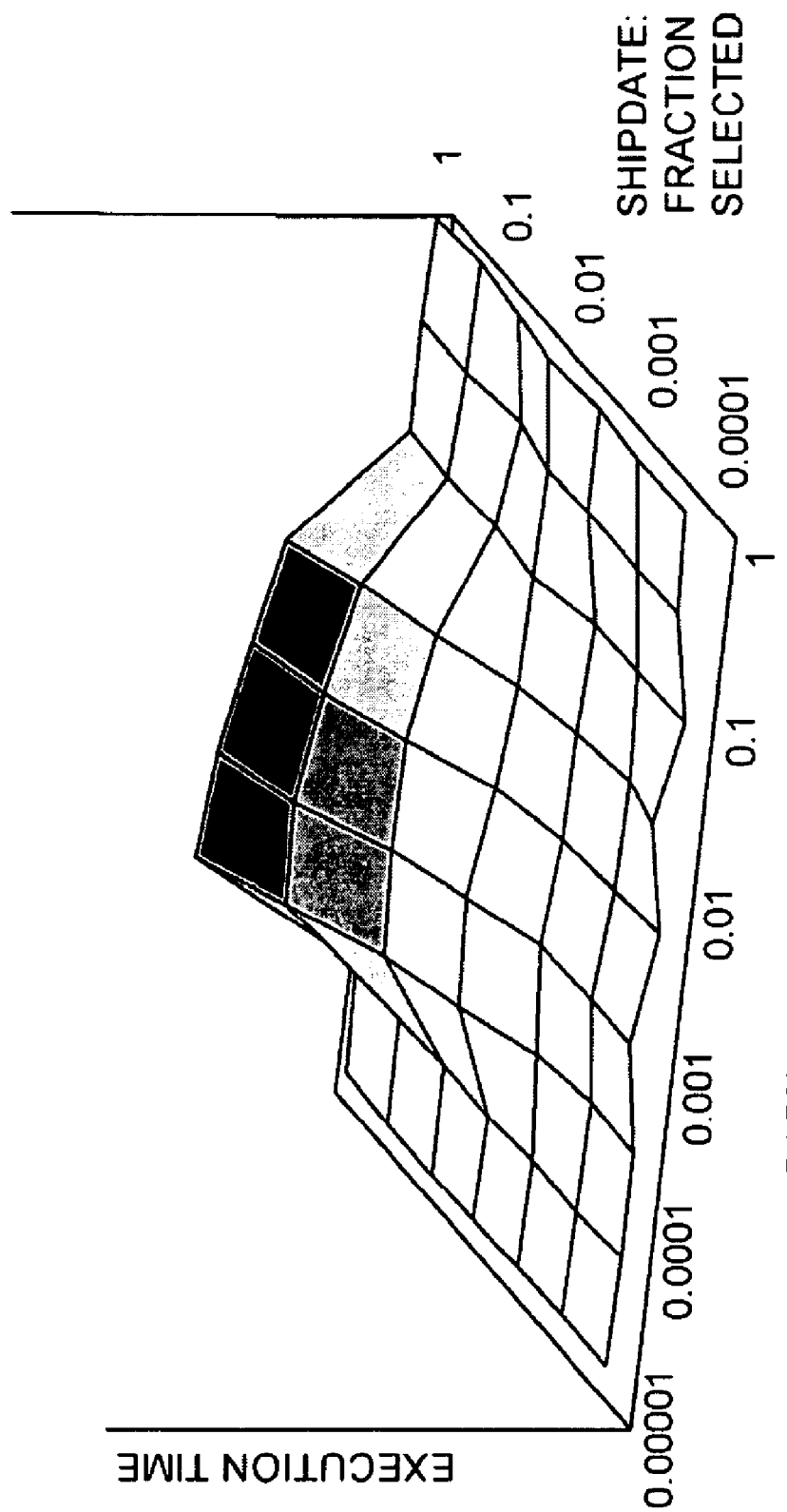

Referring to FIG. 7H, a three-dimensional diagram illustrates relative performance of a system using a two-column index, depicting the relative performance of a plan with a covering two-column index in an a software system different from that analyzed with respect to FIG. 7G. Due to multi-version concurrency control applied only to rows in the main table, the plan involves fetching full rows. In other words, the space overhead of multi-version concurrency control seems to have forced the developers of the system to apply concurrency control only to rows in the main representation of the table. Thus, the advantages of covering non-clustered indexes, including joins of multiple non-clustered indexes are disabled.

In the query execution plan, rows to be fetched are sorted very efficiently using a bitmap. The plan is close to optimal in this system over a much larger region of the parameter space. Moreover, the plan's worst quotient is not as bad as that of the prior plan shown in FIG. 7G. Thus, if the actual value of parameters is not known at compile-time, the plan is probably much more desirable even if the plans of FIG. 7E and FIG. 7F are judged more efficient at compile-time based on anticipated predicate selectivities. Thus, robustness might well trump performance in those situations.

Figure 7I:
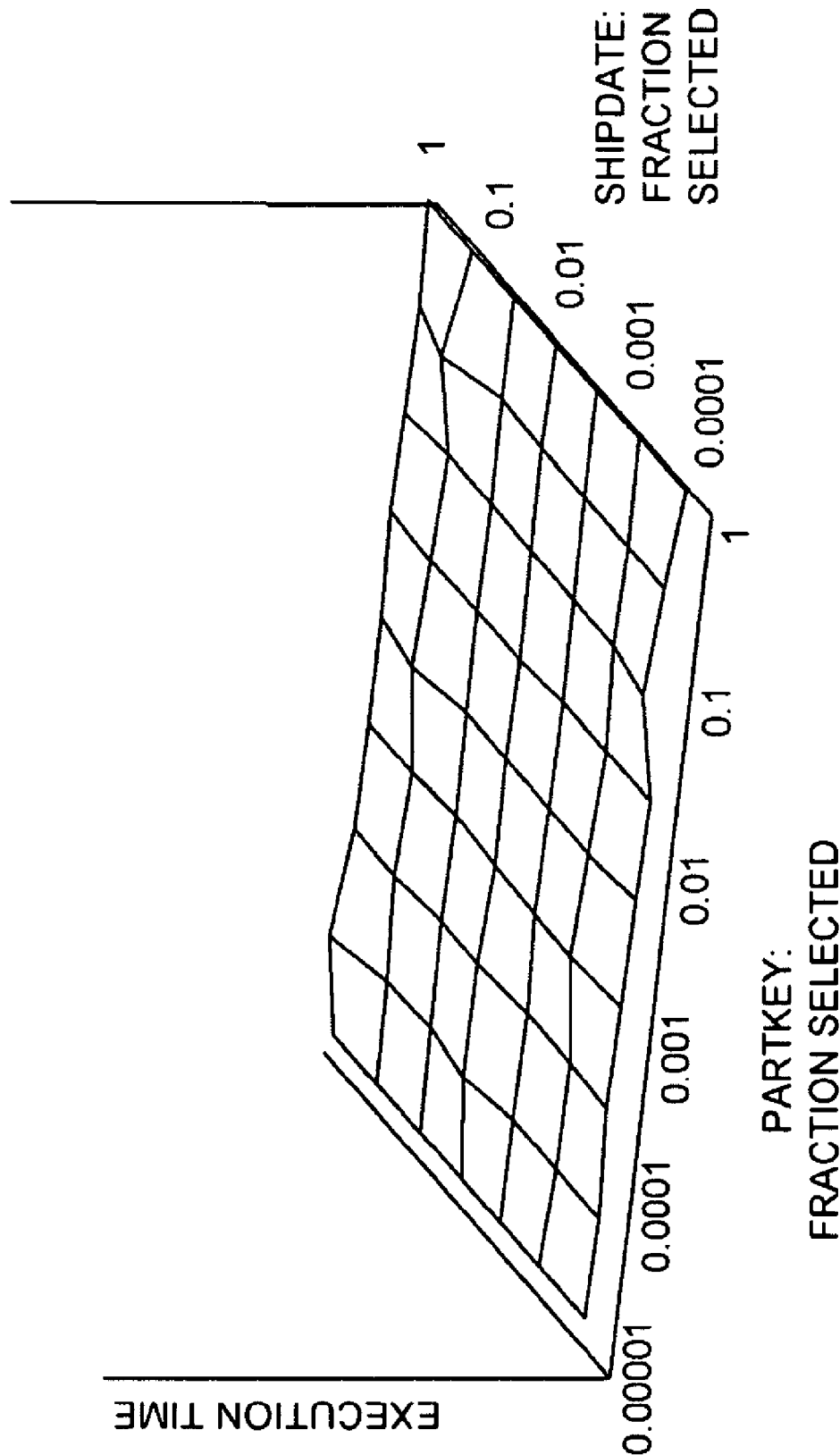

Referring to FIG. 7I, a three-dimensional robustness map shows the most robust plan in a third system. Relative performance is good across the entire parameter space, albeit not optimal. The foundation of consistent performance is a sophisticated scan for multi-column indexes described as multi-dimensional B-tree access. Data points indicate that the plan is the best query execution plan (indicated by a cost factor 1 or a light green color or light monochrome shade).

The visualization techniques employed to form the diagrams enable rapid verification of expected performance, testing of hypotheses, and insight into absolute and relative performance of alternative query execution plans. For even a very simple query, a plethora of query execution plans can be used. Investigating many plans over a parameter space with multiple dimensions is possible only with efficient visualizations.

Other robustness maps can be created to analyze other aspects of performance. For example, worst performance can be mapped to detect particularly dangerous plans and relative performance of plans compared to worst possible performance. In addition, multiple systems and available plans can be compared in combination.

Other software development activities can be performed on the basis of the visualizations. For example, a developer can focus on improving the performance of the best plan at some points deemed important within the parameter space—a traditional focus on achievable performance. Also, a developer can focus on performance of the plan with the broadest region of acceptable performance and then improve performance in the regions of the parameter space where the plan's performance is poor—a focus on robustness of a specific plan and, if that plan is chosen during query optimization, on robustness of query processing as a whole.

Another robustness map visualization is a single map showing all possible query execution plans, indicating the best plan for each point and region in the parameter space, perhaps using a color for each plan. One aspect of the map can be the size and the shape of each plan's optimality region. The regions can be continuous, simple shapes.

For query execution, analysis can focus on irregular shapes of optimality regions. Often, some implementation idiosyncrasy rather than the algorithm can cause the irregular shape. Removal of such idiosyncrasies may lead to more efficient as well as more robust query execution.

Some techniques can enlarge the largest region, possibly even eliminating some smaller regions and thus some plans from the map of optimality. Every plan eliminated from the map implies that query analysis need not consider the eliminated plan. Reducing the plan space in query analysis contributes to the robustness.

Figure 7J:
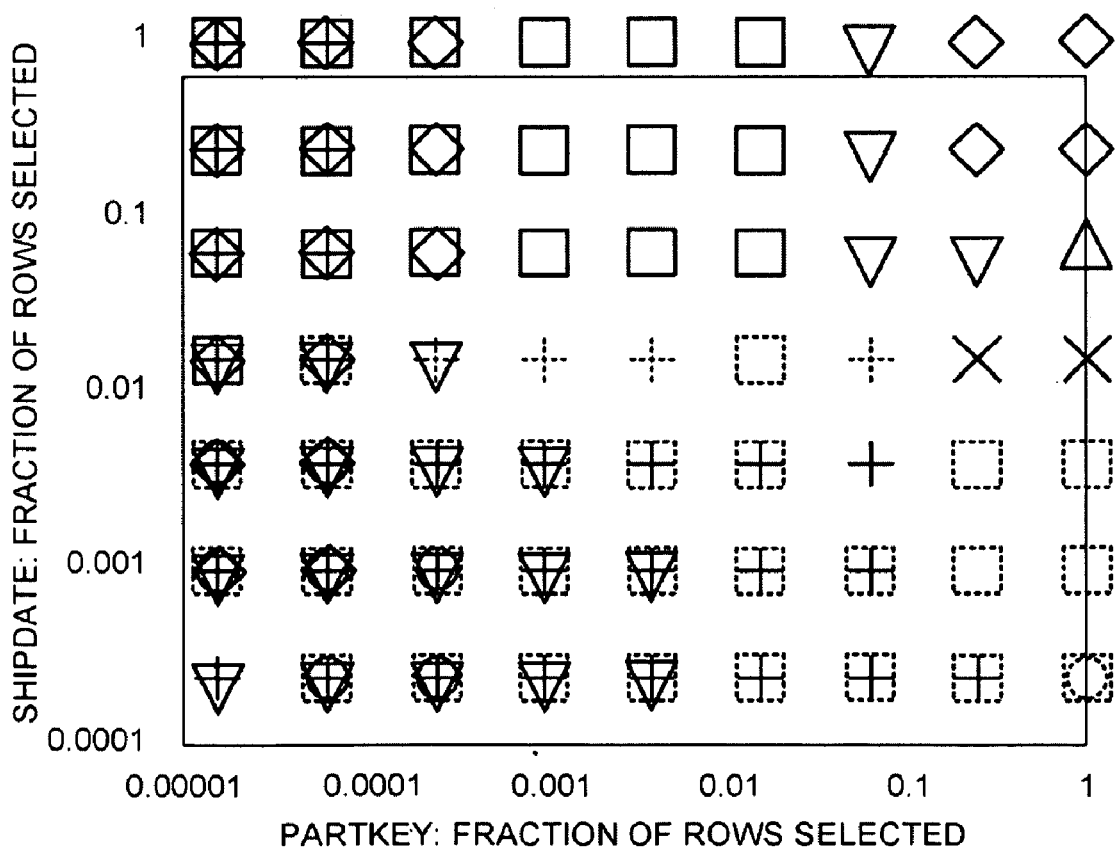

Referring to FIG. 7J, a diagram, shows mapping of regions of optimality. Most points in the parameter space have multiple optimal plans (within 0.1 sec measurement error). In fact, when analyzing optimality, all small differences should be neglected. For example, two plans with actual execution costs within 1% of each other are practically equivalent. Whether the tolerance ends at 1% difference, at 20% difference, or at a factor of 2 depends on a tradeoff between performance and robustness, and thus the tradeoff between the expense of system resources and the expense of human effort for tuning and problem resolution.

Variants of FIG. 7H and FIG. 7I can be used to show the region of optimality for a specific plan. Since the number of plans that may cover any one point in the parameter space is large, shading using two colors is typically not sufficient, but a diagram with points shaded in a large number of colors seems more confusing than illuminating. Thus, this type of diagram inherently requires one diagram per plan and thus many diagrams.

FIGS. 7K(1) and 7K(2) illustrate robustness maps for two-predicate index scan implementations. Robustness maps are designed to quantify and visualize how performance degrades as work increases and resources decrease. A plan or operator under test is fixed and performance is measured while forcing execution across a spectrum of conditions with results then plotted in a Euclidean space. The resulting shape illustrates performance degradation patterns. Slope indicates how quickly performance degrades, while curvature indicates how predictably performance degrades. Areas where the rate of performance rapidly and unpredictably drops are manifest. For example, FIGS. 7K(1) and 7K(2) compare three-dimensional robustness maps for two different implementations of a given operator, charting performance of an index scan while varying the selectivity of two predicates. Other robustness maps can be used to show how a given plan's performance compares to that of the best plan. Although only two- and three-dimensional maps are depicted herein, the technique can be used with any metric space.

Robustness maps enable analysis and reasoning about the executor's impact on query robustness. By making visible where and how performance changes, the maps show developers and regression testers the circumstances under which performance is particularly sensitive to small deviations from expected conditions. Developers can then address this sensitivity. Robustness maps thus enable a different view of performance than tests that focus on pure execution time or throughput. Robustness maps enable motivation, tracking, and protection of improvements in query execution by providing a concrete and intuitive "big picture" of the performance landscape.

The robustness map approach can be tested by building robustness maps for simple queries from the TPC-H benchmark. All database instances can be loaded with the same line item table, using the same rows (in the same order). A scale factor 10 instance of TPC-H can be used resulting, for example, in 60M rows (6 GB). In an example analysis, five indexes are built upon the table including a default clustered index on the primary key, two single column indexes on the query predicate columns, and a pair of two-column indexes on the query predicate columns. A selected number of maps are constructed and analyzed for the three systems. For example, FIGS. 7K(1,2) show that one implementation of index nested loops join is more resilient than another to variance in input data sizes, a graceful degradation that may result from the first implementation's efficient sort operation.

Figure 7L:
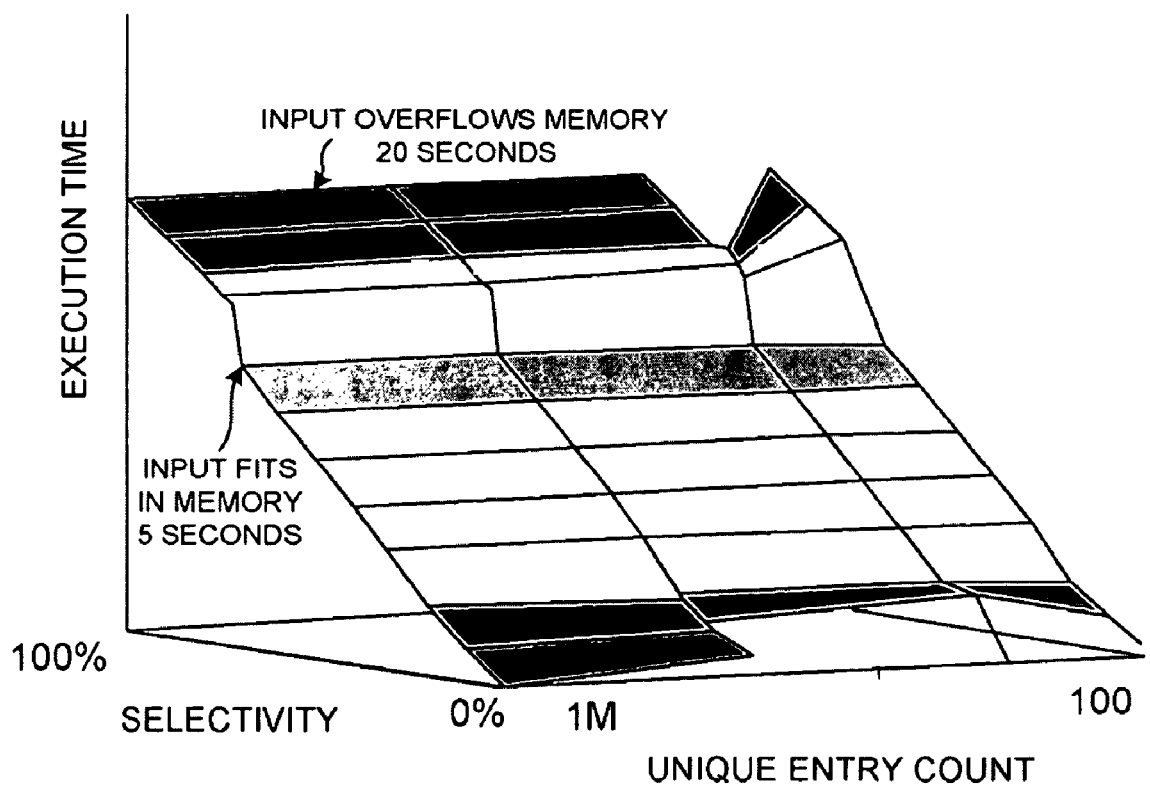

Thus robustness maps can be used to evaluate the robustness of a sort operator. FIG. 7L shows a three-dimensional robustness map comparing the relative performance of the sort operator while varying selectivity and duplicate values. A dramatic drop in performance occurs when the data input no longer fits in memory. If estimated selectivity were one row short of the amount that would fit into memory, and the actual data size only two rows more, the sort operation would take nearly five times longer than expected.

Figure 7M:
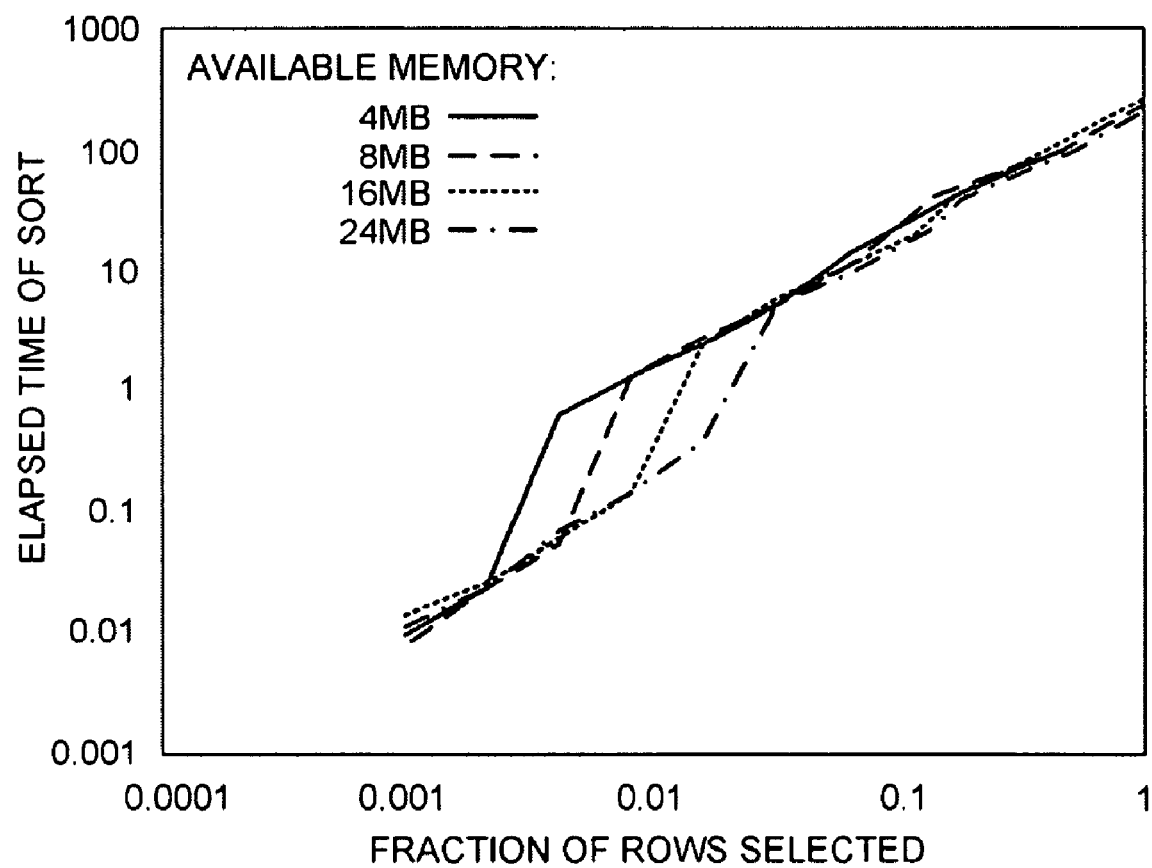

Although such a performance drop or cliff could be considered easily anticipated, since memory availability and cardinality estimates can be checked at compile-time, when the plan is selected. However, a query optimizer bases cost estimates for a sort operation on the amount of configured memory and initial cardinality estimates, both of which are subject to significant change from compile time to run-time. Resource contention can reduce the amount of available memory to a small fraction of that anticipated. Multiple levels of intermediate results can compound that impact. FIG. 7M maps how performance degrades as available memory decreases and shows how memory contention changes the location of the critical point where a small increase in data size causes a major drop in performance.

Run-time performance of any query plan can vary dramatically depending on execution conditions such as actual predicate selectivity and contention for memory and other resources. Execution conditions vary unpredictably, leading to the unexpectedly long-running queries that plague database users and administrators today. Thus, robust query processing reduces cost of ownership by reducing the need for human intervention.

In general, robustness in database query processing can be improved by modifications in query optimization, query execution, workload management, and other components. The systems and techniques disclosed herein focus on query execution. Robustness maps can be used to visualize performance of query execution algorithms and plan fragments, enabling understanding of behavior across a wide range of unexpected situations.

Various visualization techniques reveal different insights. Robustness maps with two- and three-dimensional parameter spaces are introduced, including discussion of robustness map interpretation, a demonstration of how to detect landmarks that appear on the maps, and a discussion of implications for robustness.

Visualizing the performance of specific algorithms, associated implementations, and plan fragments using the algorithms enables analysis of strengths and weaknesses. Adaptive techniques during run-time query execution can have as great an impact on robust query processing as plan choices during compile-time query optimization. Adaptive run-time techniques pertain to data volumes, resource availability including memory, and the specifics of the memory hierarchy.

Robustness map analysis and its visualization can be extended to additional query execution algorithms including sort, aggregation, join algorithms, and join order. For example, some implementations of sorting spill their entire input to disk if the input size exceeds the memory size by merely a single record. Those sort implementations lacking graceful degradation will show discontinuous execution costs. Other resources may introduce similar effect, such as a sort input exceeding the size of the CPU cache or the size of flash memory.

Robustness maps enable visualizations of entire query execution plans including parallel plans. A benchmark can be defined that focuses on robustness of query execution and, more generally, of query processing. The benchmark can be used to identify weaknesses in the algorithms and implementations, track progress against weaknesses, and permit daily regression testing to protect the progress against accidental regression due to other, seemingly unrelated, software changes.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-implemented system comprising: a logic circuit to:
    receive at least one robustness map of measured database system performance acquired during database execution in a range of runtime conditions, at least one of the runtime conditions of the database system being a first condition at which performance degrades by more than a first threshold;
    receive a set of query plans to be managed and a set of robustness maps including landmarks in terms of operator's cardinality, resource conditions, and performance for a target database management system;
    identify landmarks pertinent to the query plans;
    extract a set of landmarks indicative of the conditions causing performance to degrade in a manner different from a proper manner and indicative of probabilities of the conditions;
    analyze a state of a currently executing query by locating the query's performance on the at least one robustness map; and
    monitor execution of a query plan of the query plans by performing at least one of:
        characterizing a range and trends of current operating conditions;
        identifying robustness landmarks pertinent to the executing query within a current range of operating conditions wherein performance is known to degrade in a manner different from the proper manner by the first threshold or a second threshold;
        identifying robustness landmarks pertinent to the executing which are likely to be encountered with persisting current trends; and
        determining, for the executing query, whether corrective action is merited.

2. The system according to claim 1 wherein the logic circuit is to invoke a corrective action or raise a warning.

3. The system according to claim 1 further comprising:
    a target database system, wherein the logic circuit is to:
    receive a set of runtime statistics associated with the target database system; and
    analyze the set of robustness maps and the runtime statistics to characterize ranges and trends of current operating conditions, identify robustness landmarks present in the current range of operating conditions, and identify robustness landmarks to be subsequently encountered with a probability if operating condition trends persist.

4. A computer-implemented system comprising:
    a logic circuit to:
    receive at least one robustness map of measured database system performance acquired during database execution in a range of runtime conditions;
    receive a set of query plans to be managed and a set of robustness maps including landmarks in terms of operator's cardinality, resource conditions, and performance for a target database management system;
    identify landmarks pertinent to the query plans;
    extract a set of landmarks indicative of the conditions causing performance to degrade in a manner different from a proper manner and indicative of probabilities of the conditions;
    perform workload management of at least one query by locating performance of the at least one query on the at least one robustness map, the at least one robustness map indicating at least one set of runtime conditions of the database system at which performance degrades more than a first threshold; and
    monitor execution of a query plan of the query plans by performing at least one of:
        characterizing a range and trends of current operating conditions;
        identifying robustness landmarks pertinent to executing query within a current range of operating conditions wherein performance is known to degrade in a manner different from the proper manner by the first threshold or a second threshold;
        identifying robustness landmarks pertinent to the executing which are likely to be encountered with persisting current trends; and
        determining, for the executing query, whether corrective action is merited.

5. The system according to claim 4
wherein the logic circuit is to perform the workload management by admitting queries, generating query plans, scheduling queries, and controlling query execution.

6. The system according to claim 4 wherein the logic circuit is to:
receive a set of system information and runtime statistics;
track execution conditions for the at least one query in terms of actual resource availability and cardinality conditions;
analyze query execution relative to the set of landmarks and set of system information and runtime statistics;
determine whether execution conditions approach landmarks associated with a monitored query plan in the set of landmarks; and
evaluate management action with regard to the executing query.

7. The system according to claim 6
wherein the logic circuit is to: determine whether management action is warranted;
when the management action is warranted, determine the management action and invoke the management action;
determine whether the management action warrants creation of a new query plan;
when creation of the new query plan is warranted, update landmarks relevant to monitored query plans in the set of landmarks; and write the updated landmarks to the set of landmarks.

8. A computer-implemented system comprising:
a logic circuit to receive at least one robustness map of measured database system performance acquired during database execution in a range of runtime conditions and to perform workload management of at least one query by locating performance of the at least one query on the at least one robustness map, the at least one robustness map indicating at least one set of runtime conditions of a database system at which performance degrades more than a first threshold, the performing workload management selected from a group consisting of:
selectively admitting, rejecting, or re-optimizing a selected query based on whether the robustness map indicates execution of the selected query under current runtime conditions has a predetermined probability of sudden performance degradation;
scheduling a selected query to execute when the robustness map indicates resource availability conditions have a predetermined probability of attaining a predetermined level of favorability;
canceling and optionally re-optimizing and re-submitting an executing query when the robustness map indicates resource availability conditions are moving toward an area on the robustness map that is identified to contain a defined robustness problem;
reducing system load when the robustness map indicates resource availability conditions are insufficient for current workload;
scheduling queries using robustness maps to identify resource requirements and prevent resource conflicts with concurrently executing queries;
generating an alarm when the robustness map indicates entry of an executing query into proximity of a defined robustness landmark; and
producing an analysis of progress of an executing query by locating performance of the executing query on robustness maps including monitoring current trends in runtime conditions and proximity of the executing query to robustness landmarks.

9. A computer-implemented method for operating a database system comprising:
receiving at least one robustness map of measured database system performance acquired during database execution in a range of runtime conditions, wherein the range of runtime conditions includes at least one set of runtime conditions of the database system at which performance degrades more than a first threshold;
receiving a set of query plans to be managed and a set of robustness maps including landmarks in terms of operator's cardinality, resource conditions, and performance for a target database management system;
identifying landmarks pertinent to the query plans;
extracting a set of landmarks indicative of the conditions causing performance to degrade in a manner different from a proper manner and indicative of probabilities of the conditions;
analyzing a state of a currently executing query by locating performance of the query on the at least one robustness map;
performing workload management of the query by locating the performance of the query on the at least one robustness map; and
monitoring execution of a query plan of the query plans by performing at least one of:
characterizing a range and trends of current operating conditions;
identifying robustness landmarks pertinent to the executing query within a current range of operating conditions wherein performance is known to degrade in a manner different from the proper manner by the first threshold or a second threshold;
identifying robustness landmarks pertinent to the executing which are likely to be encountered with persisting current trends; and
determining, for the executing query, whether corrective action is merited.

10. The method according to claim 9 wherein performing the workload management comprises admitting queries, generating query plans, scheduling queries, and controlling query execution.

* * * * *

UNITED STATES PATENT AND TRADEMARK OFFICE
CERTIFICATE OF CORRECTION

PATENT NO.      : 8,224,811 B2
APPLICATION NO. : 12/364113
DATED           : July 17, 2012
INVENTOR(S)     : Harumi Kuno et al.

It is certified that error appears in the above-identified patent and that said Letters Patent is hereby corrected as shown below:

In column 18, line 50, in Claim 10, delete "claim 9" and insert -- claim 9, --, therefor.

Signed and Sealed this
Twenty-second Day of January, 2013

David J. Kappos
*Director of the United States Patent and Trademark Office*